US006813542B2

(12) United States Patent
Peshkin et al.

(10) Patent No.: US 6,813,542 B2
(45) **Date of Patent: *Nov. 2, 2004**

(54) MODULES FOR USE IN AN INTEGRATED INTELLIGENT ASSIST SYSTEM

(75) Inventors: Michael A. Peshkin, Evanston, IL (US); J. Edward Colgate, Evanston, IL (US); Julio Santos-Munne, Glenview, IL (US); David Meer, Skokie, IL (US); James Lipsey, Chicago, IL (US); Witaya Wannasuphoprasit, Bangkok (TH); Stephen H. Klostermeyer, Mt. Prospect, IL (US)

(73) Assignee: The Stanley Works, New Britain, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/781,801

(22) Filed: Feb. 12, 2001

(65) Prior Publication Data

US 2002/0111712 A1 Aug. 15, 2002

(51) Int. Cl.[7] ................................................ G06F 19/00

(52) U.S. Cl. ....................... 700/245; 700/213; 700/249; 700/258; 700/260; 700/261; 700/264; 414/5; 414/6; 414/331.03; 414/331.04; 414/591; 414/730; 318/628; 318/632; 901/3; 901/9

(58) Field of Search ................................ 700/213, 245, 700/249, 258–261, 264; 414/5, 6, 285, 286, 331–335, 516, 591, 685, 730; 318/568.11, 568.16, 628, 632; 244/161; 901/3, 9, 15; 701/2

(56) References Cited

U.S. PATENT DOCUMENTS

| | | | | | |
|---|---|---|---|---|---|
| 3,451,507 | A | * | 6/1969 | Santos | 188/44 |
| 4,389,706 | A | * | 6/1983 | Gomola et al. | 700/1 |
| 4,944,056 | A | * | 7/1990 | Schroeder et al. | 5/85.1 |
| 5,245,279 | A | * | 9/1993 | Bendzsak | 324/225 |
| 5,275,045 | A | * | 1/1994 | Johnston et al. | 73/379.01 |
| 5,590,046 | A | * | 12/1996 | Anderson et al. | 700/171 |
| 5,729,249 | A | * | 3/1998 | Yasutake | 345/173 |
| 5,790,407 | A | * | 8/1998 | Strickland et al. | 700/169 |
| 5,831,408 | A | * | 11/1998 | Jacobus et al. | 318/568.11 |
| 6,092,678 | A | * | 7/2000 | Kawano et al. | 212/86 |
| 6,109,568 | A | * | 8/2000 | Gilbert et al. | 246/3 |
| 6,135,301 | A | * | 10/2000 | Monzen et al. | 212/275 |
| 6,157,866 | A | * | 12/2000 | Conboy et al. | 700/121 |
| 6,313,595 | B2 | * | 11/2001 | Swanson et al. | 318/568.11 |
| 6,386,513 | B1 | * | 5/2002 | Kazerooni | 212/285 |
| 6,648,102 | B2 | * | 11/2003 | Bostelman et al. | 182/150 |
| 6,654,665 | B2 | * | 11/2003 | Arai et al. | 700/258 |
| 6,738,691 | B1 | * | 5/2004 | Colgate et al. | 700/245 |

FOREIGN PATENT DOCUMENTS

| | | | |
|---|---|---|---|
| DE | 297 19 865 | 3/1998 | B66C/11/00 |
| WO | WO 98/43911 | 10/1998 | B66D/1/00 |
| WO | WO 99/21687 | 5/1999 | B25J/9/18 |
| WO | WO 00/46570 | 8/2000 | G01B/7/312 |
| WO | WO 01/05697 | 1/2001 | B66D/3/22 |

OTHER PUBLICATIONS

International Search Report for PCT/US02/03997.

* cited by examiner

*Primary Examiner*—Donald P. Walsh
*Assistant Examiner*—Jeffrey A. Shapiro
(74) *Attorney, Agent, or Firm*—Pillsbury Winthrop LLP

(57) ABSTRACT

An intelligent assist system having a modular architecture, coordinated by electronic communication links between the modules. Modules for motion, computation, interface, and programming are disclosed in exemplary embodiments.

40 Claims, 28 Drawing Sheets

| FIELD | SIZE (BYTES) | DATA FORMAT | DESCRIPTION |
|---|---|---|---|
| SIZE | 1 | BINARY | PACKET SIZE. |
| DEVICE_ID | 1 | BINARY | DESTINATION DEVICE ID. |
| CMD_TYPE | 1 | BINARY | COMMAND TYPE. |
| DATA | VARIABLE | BINARY | ACTUAL DATA ASSOCIATED WITH THE CMD_TYPE FIELD. |
| CHKSUM | 1 | BINARY | CHECKSUM OF PACKET. THIS BYTE EQUALS TO THE TWO'S COMPLEMENT OF THE SUM OF THE SIZE, DEVICE_ID, TYPE AND DATA, OMITTING ANY CARRY. |

*FIG. 38*

MODULES FOR USE IN AN INTEGRATED INTELLIGENT ASSIST SYSTEM

FIELD OF INVENTION

The present invention relates to the field of programmable robotic manipulators and assist devices, and in particular, robotic manipulators and assist devices that can interact with human operators.

BACKGROUND OF THE INVENTION

In an industrial application such as a manufacturing assembly line or general material handling situation, the payload may be too large for a human operator to move without mechanical assistance or risking injury. Even with lighter loads it may be desirable to provide a human operator with mechanical assistance in order to allow more rapid movement and assembly, avoid strain, fatigue or repetitive motion injuries. Thus, a great deal of industrial assembly and material handling work is done with the help of assist devices such as x-y overhead rail systems. There are two primary examples of these types of devices: (1) powered overhead gantry cranes for large loads, usually running on I-beams, and (2) unpowered overhead rail systems for smaller loads running on low-friction enclosed rails.

These types of assist devices may be passive devices or active devices. For smaller loads, a passive overhead rail system may be used to assist an operator in supporting the load. The operator may push on the payload directly, causing the trolley and bridge rail to move along with the payload to assist the operator in handling the load.

A number of problems, however, plague unpowered overhead rail systems. Getting the payload moving is not the primary one. This can be done by forward pushing, using the large muscles of the lower body which are not easily injured. Controlling the motion of the moving payload is a greater problem, as it requires pulling sideways with respect to the payload's direction of motion, generally using the smaller and more easily injured muscles of the upper body and back.

Anisotropy is a further problem. Although low-friction designs are used, both the friction and the inertia are greater in the direction in which the payload has to carry with it the whole bridge rail than in the direction in which the payload simply moves along the bridge rail. Anisotropy produces an unintuitive response of the payload to applied user forces and often results in the user experiencing a continuous sideways "tugging" as the payload moves, in order to keep it on track. Both steering and anisotropy contribute to ergonomic strain, lower productivity, and a changeover to slower gantry cranes at an unnecessarily low payload weight threshold.

Active devices can be used to generate additional forces which an operator can call upon to further assist in supporting or moving a payload. For larger loads, an active motor-driven trolley and bridge rail transport can be used to assist the operator by providing a mechanical assist. Such additional forces can be generated by motors, balancers, hydraulics, etcetera, which can typically be controlled by the operator.

Intelligent Assist Devices ("IADs") are a class of computer-controlled machines that interact with a human operator to assist in moving a payload. IADs may provide a human operator a variety of types of assistance, including supporting payload weight, helping to overcome friction or other resistive forces, helping to guide and direct the payload motion, or moving the payload without human guidance. The Robotics Industries Association T15 Committee on Safety Standards for Intelligent Assist Devices describes IADs as a single or multiple axis device that employs a hybrid programmable computer-human control system to provide human strength amplification, guiding surfaces, or both. These multifunctional assist devices are designed for material handling, process and assembly tasks that in normal operation involve a human presence in its workspace. Typically, Intelligent Assist Devices (IADs) are force-based control devices that range from single axis payload balancing to multiple degree of freedom articulated manipulators.

IADs may have multiple modes of operation such as a hands-on-controls mode providing a powered motion of the IAD when the human operator is in physical control and contact with the IAD primary controls. In addition, a hands-on-payload mode provides a selectable powered motion of the IAD in response to the operator positively applying forces to the payload or tooling, when the operator's hand(s) are not on the primary controls. A hands-off mode provides a powered motion of the IAD that is not in response and proportion to forces applied by the operator. Within each of these modes, the IAD may employ features such as force amplification, virtual guiding surfaces, and line tracking technologies.

Because IADs are intended for close interaction with human operators, unambiguous communication of IAD mode of operation to the human operator is particularly important. The man-machine interface should be clearly and ergonomically designed for efficient use of the system and safety of the operator. Ease and intuitiveness of operation is necessary for achieving high levels of productivity. Because of the close interaction of man and machines, safety of the human operator is most important. For example, the IAD mode shall be signaled by a continuous mode indicator that is readily visible to the operator and to other personnel in or near the IAD's workspace. Furthermore, attention should be paid to the design of the operator's controls such that inadvertent or mistaken changes of mode are minimized.

Another main objective in developing IADs is to merge the best of passive and active devices. Needed is the powered assistance currently available with gantry cranes, but the quick and intuitive operator interface that currently is available only from unpowered rail systems is also desirable. Needed is better ergonomic performance than unpowered rail systems and greater dexterity and speed than gantry cranes allow. Also needed is the ability to use the IAD with larger payloads than current unpowered rail systems allow.

In addition, needed is the ability to connect and integrate a number of IAD components to work together, and a computer interface design that allows an technician or system integrator to easily program, operate and monitor the status of an IAD system made up of a plurality of components.

SUMMARY OF THE INVENTION

The present embodiments described herein address the need for natural and intuitive control of the motion of a payload by a human operator for ease of use and safety. According to the exemplary embodiments, disclosed is a modular architecture of components that can be programmed to create intelligent assist devices ("IADs) from a number of components. Disclosed is a modular system architecture coordinated by serial digital communication, to allow ease of configuration to a variety of applications. Also, the digital communication may be extended to allow integration with information networks within an industrial plant such as an integrated manufacturing or enterprise management system.

The embodiments further provide graphical configuration software which facilitates setup and maintenance of the IAD and allows the selection of user profiles customized such that each operator may be most comfortable with the behavior of the IAD. The software is allows integration, configuration and programming of components to perform tasks and simplify testing and monitoring of the system to increase ease of operation.

Provided are programmable modes of operation in which the operator may apply manual forces directly to the payload ("hands-on-payload" motion as described above), affording better control than possible when the operator's hands must be placed only on the control locations.

According to an aspect of the embodiments, provided are Intent Sensors suited to intuitive and transparent control of motion in hands-on-controls mode, so-called because ideally they provide a measure of the intent of the operator for payload motion.

According to another aspect of the embodiments, provided is a means of clearly communicating the IAD mode of operation to the operator and the operator commands to change IAD operational modes. Further provided is an interface capability to system integrators, so that they may easily and economically integrate task-specific tooling to the functioning of the IAD.

According to another aspect of the embodiments, provided is a multi-functional Hub which serves as a communication center for the operator, integrator and for system components. The hub can also act as a mechanical component of the system to support a tooling or payload and integrate electrical and pneumatic components of the system.

The exemplary embodiments have many uses and advantages. In auto assembly for example, a computer prints out a paper "manifest" that travels with the vehicle, instructing the workers which parts to install on each vehicle. After assembly a quality inspection must be done to make sure that the right parts were in fact installed. If there are errors expensive rework is required. Using the exemplary embodiments, the IAD that a worker used to go fetch a part can be interfaced to a computer, which could, by monitoring the IAD's trajectory, make sure the right part storage rack is being approached. By "tugging" a bit in the correct direction the IAD could help the worker select the correct rack. Accurate prediction of part count remaining in a rack could be made, and intra-plant deliveries of additional parts scheduled.

Furthermore, there are other benefits to computer interface. Currently, assist devices are immobile when not driven by a worker. In contrast, a device that performs autonomous programmable motion is called a robot and if an operation is to be performed by a robot, human workers must be excluded from the vicinity for their own safety. So a particular task is generally either robotic or non-robotic, and with few options in between. IADs, however, by virtue of their computer interface can make mixed tasks possible, which may be termed "semi-autonomous behavior". IADs make semi-autonomous behaviors possible in proximity and collaboration with human workers. Described herein are several examples of semi-autonomous behaviors motivated by automobile assembly that can be implemented by the exemplary embodiments.

For example, a line-tracking function can allow the operator to use both hands while the payload coasts along adjacent to the moving assembly line. Currently, the need to have the assist device follow along encourages both operators and plant engineers to leave the assist device physically enmeshed with the moving vehicle during such phases leading to unexpected collisions or entanglements that can lead to serious accidents.

A programmed "Drift away" feature can allow the payload to retreat from the moving assembly line to a safe location when it is unloaded (or when a button is pushed). Currently this can be accomplished with a hard shove or a tilted rail so that gravity pulls the payload away. Neither solution is satisfactory and both involve unnecessarily high payload speeds.

An Auto-return mode can allow the tooling to return to a loading station unattended while the operator continues work on the vehicle. The operator can therefore walk swiftly back to the loading station to pick up the next subassembly, unburdened by the empty tooling.

An auto-delivery mode in which the next subassembly is brought by the rail system, unattended, from the loading station to the current vehicle location. Using line tracking, the next vehicle's location can be predicted accurately. However, should the vehicle location get out of phase for any reason, the operator simply moves the tooling manually to the correct location. Each subsequent delivery is referenced to the previous one, minus one vehicle length, plus line tracking. Thus, a synchronization problem is corrected quickly and almost unnoticed.

The above examples primarily benefit worker and industrial productivity. Semi-autonomous behaviors can also be implemented in support of safety.

As a first example, a resisting approach to the assembly line when the task phase is incorrect can be provided. A human operator can overpower the IAD, but its resistance serves as an hard-to-ignore signal that something is wrong. A second example is a Line emergency-stop when excessive force is detected, as for instance when the payload or tooling is caught in the moving assembly line.

Intelligent Assist Devices can also address ergonomics concerns. IADs can guide human & payload motion, minimizing the need for operator-produced lateral or stabilizing forces. Lateral and stabilizing forces use the muscles of the upper body and back, which are susceptible to injury.

Another ergonomic advantage relates to navigation & inertia management. IADs can assist in the maneuvering of large, unwieldy objects, especially where complicated motions or tight tolerances are necessary. Yet another ergonomic advantage relates to workspace isotropy, or avoiding the awkwardness of rail systems: heavy assemblies supported by overhead rails are often much easier to move parallel to the bridge rail than parallel to the fixed rails. This non-uniformity of workspace leads to awkward movements. IADs can mask the non-uniformity.

There are still yet other advantages as well. The foregoing and other features and advantages of the illustrative embodiments of the present invention will be more readily apparent from the following detailed description, which proceeds with references to the accompanying drawings.

BRIEF DESCRIPTION OF THE DRAWINGS

FIG. 38 is a diagram illustrating an exemplary structure of a communication packet utilized in communication between the computational nodes of FIG. 1.

DETAILED DESCRIPTION OF THE EXEMPLARY EMBODIMENTS

The system and method disclosed herein provides for a more natural and intuitive control of the motion of a payload. The system and method are implemented on an overhead rail system of known type. It should be understood, however, that the present embodiments are not limited to the exemplary embodiments disclosed herein, but that they may also be implemented in systems that utilize other kinds of material handling systems including gantry cranes, jib cranes, monorails, articulated systems, and so forth. Therefore, details regarding the overhead rail system including the types of material handling hardware are provided as an example, and are not necessary to the invention unless otherwise specified as such.

Figure 1:
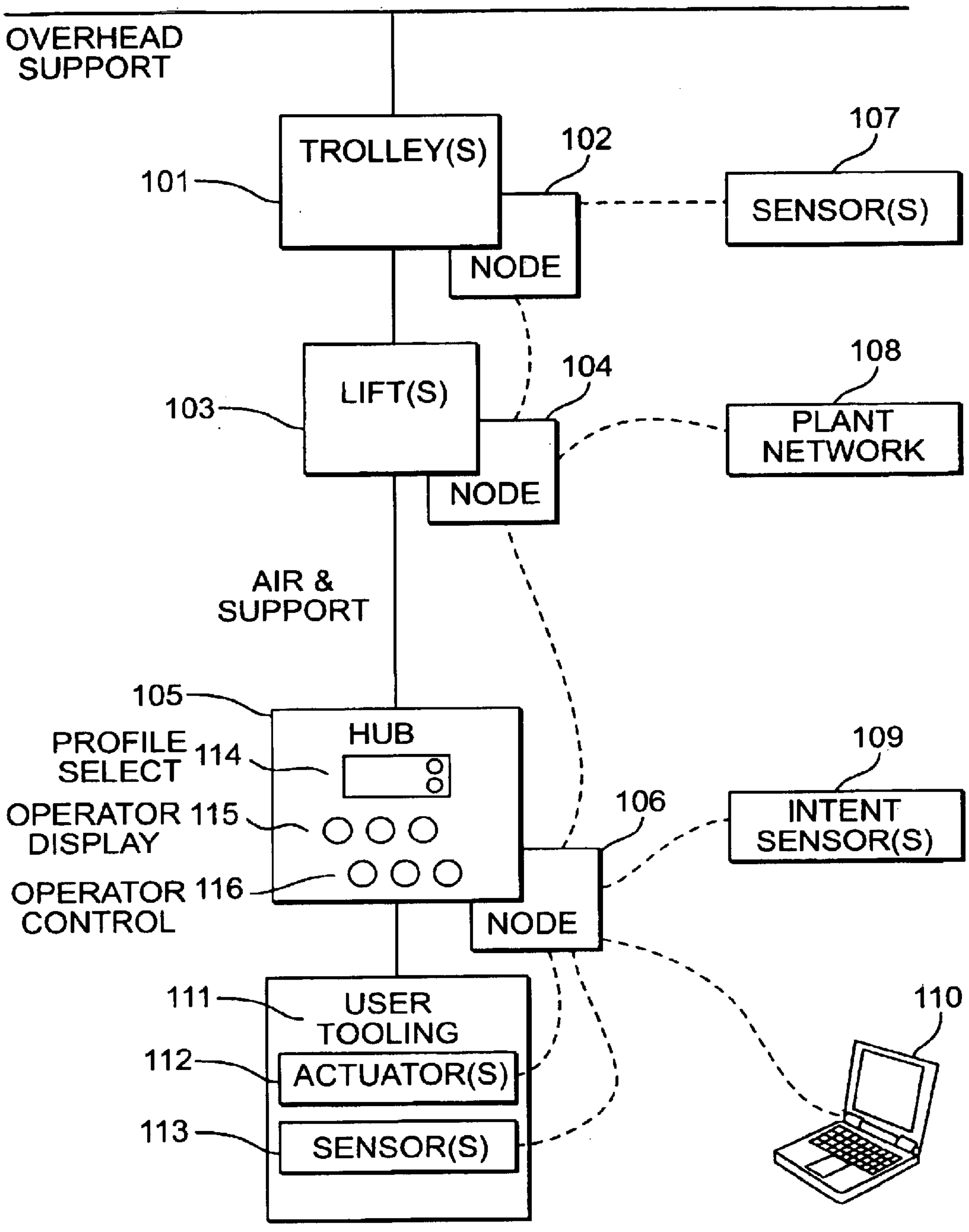
FIG. 1 is a high-level block diagram illustrating an exemplary modular architecture.

FIG. 1 is a high-level block diagram illustrating an exemplary modular architecture. The described modular architecture includes the interconnection of modules such as a trolley 101, lift 103, sensor 107, hub 105, intent sensor 109, and user tooling 111 via computational nodes 102, 104, and 106 to plant information systems such as a plant network 108 and user-supplied or system-integrator-supplied components such as computer 110.

The modular architecture is capable of implementing virtual guiding surfaces within the intelligent assist device (IAD) workspace, by virtue of the communication among the modules that control individual axes. Such virtual surfaces may be varied depending on inputs from the plant network 108 or local sensors 107, for example to reflect the dimensions or positions of different workparts arriving in the IAD's workspace.

In the exemplary embodiment, the mechanical support framework is an overhead rail system of known type, preferably of the low-friction "enclosed track", but optionally of the less expensive I-Beam type. The overhead rail system can utilize one or more bridge rails that ride on runway rails to provide motion in an xy plane (i.e., preferably parallel with the ground), and devices to provide motion along a z direction. Other overhead rail systems may be utilized to accommodate modules for other kinds of material handling hardware including gantry cranes, jib cranes, monorails, articulated systems, and others. For example, according to the described exemplary embodiment, a jib crane can use one or more booms that pivot on a vertical axis, and a hoist that rides radially inward and outward along the boom.

Two modules, trolley 101 and lift 103, that can provide motion of a payload are illustrated. In the described embodiment there are three trolleys and one lift. Two of the trolleys provide motion of a bridge rail along runway rails, and the third trolley providing motion of the lift along the bridge rail, and the payload suspended from the lift. Many other configurations of modules are possible such as utilizing a lift alone, a monorail rather than a two-dimensional rail system, a trolley along a bridge rail by a passive trolley, all passive trolleys, conventional hoist or balancer in place of an intelligent lift to be disclosed herein, or no balancer or lift at all, multiple trolleys or lifts to provide additional force or other advantages, a trolley or multiple trolleys along a central rail instead of along both runway rails. Thus, it would be appreciated by one skilled in the art that the versatility of the modular architecture disclosed herein is intended to facilitate use in these and other types of configurations.

Preferably, the computational nodes 102, 104, and 106 are in communication with the modules 101, 103, 107, 105, 109, and 111 to control each module and permit communication between modules. The nodes 102, 104, and 106 are preferably in communication with the plant information network 108 and to the computer 110 such as for setup and configuration. In the exemplary embodiment, each of the modules 101, 103, 107, 105, 109, and 111 are in communication with the plant network 108 and the computer 110 via nodes 102, 104, and 106. It should be understood that other communication channels can be utilized between nodes 102, 104, and 106, such as communication with packet-based networks (e.g., Internet) and wireless networks to communicate with other systems. Such types of communication can allow data collection, data processing, or module control at a desired location.

Referring again to FIG. 1, the communication between node 104 and plant information network 108 utilizes a digital communication protocol known to those skilled in the art such as Controller Area Network (CAN) protocol, described in ISO standard 11898 which is fully incorporated by reference, or of other known type. Other types of protocols can be utilized for communication such a local area network protocol like the Ethernet protocol, which serves as the basis for the IEEE 802.3 standard. Communication between nodes 102, 104, 106 can allow for remote programming, fault monitoring, synchronization with arrival of product (as in an assembly line for a mixture of products), timing as in coordination with a moving assembly line (also known as line tracking), and many other productivity benefits may be made possible by the exchange of information.

In the described exemplary embodiment, node 102 also communicates with modules such as sensor 107, which provide geometric and positioning information about the system and payload. Sensor 107 may include other sensors such as a skew angle sensor, which measures the angular deviation of the bridge rail from perpendicularity to the runway rails. The skew angle sensor may include a resistive or hall potentiometer, an encoder, or any other means of measuring the angle deviation. In the exemplary embodiment, the sensor 107 is a resistive potentiometer. The skew angle is maintained at near zero degrees such that the bridge rail is maintained perpendicular to the runway rails by a feedback control algorithm in which the speeds of the trolley 101 at either end of the bridge rail are modified according to the measured skew angle.

Sensor 107 may also include lateral position sensors for determining the coordinates of the bridge rail and/or of the carriage along the bridge rail. The lateral position sensors may be of a variety of types, including odometry wheels, string extension sensors, laser distance sensors, coded tapes for optical or magnetic readout, ultrasonic sensors, sequences of magnets, potentiometers, and combinations of the above. In the exemplary embodiment odometry is used in combination with a single indexing magnet which is detected by a hall switch. Sensors 107 may also include a sensor for vertical motion, again using any of the above techniques or others which are known in the art. In a preferred embodiment vertical motion is available from lift 103.

Computational nodes 102, 104, 106 generally include a central processing unit (CPU) or digital signal processing (DSP) unit or microcontroller, or other computational device capable of running a stored program and capable of communication with modules, and also having digital and analog inputs and outputs in order to receive signals from sensors and switches and to control motors and other actuators and indicators. In an exemplary embodiment, computational nodes 102 and 104 include an Intel Pentium CPU with additional analog and digital support circuitry. In the exemplary embodiment, communication between nodes 102, 104, and 106 utilizes the CAN standard. However other forms of communication may also be used, including other serial protocols, Ethernet, optical communication, or RF (wireless) communication.

In the described exemplary embodiment, the functions of computational nodes 102 and 104 include communicating with node 106 of hub 105 via digital communication, communicating with configuration software resident oncomputer or personal digital assistant (PDA) (the communication passing through hub 105 or plant data network 108). Furthermore, node 102, 104, and 106 functions include communicating with other computational nodes 102, 104, and 106 via digital communication, communicating with the plant data network 108 via CAN protocol, or in a preferred embodiment, via Ethernet protocol. Moreover, the nodes 102 and 104 can execute automatic control algorithms for motion control, analog & digital input/output (I/O) involving sensors, actuators, indicators, and switches, data logging safety functions including watchdog, e-stop, and struggle detection, supporting user-programmed logic operations, controlling advanced behaviors such as virtual surfaces, soft limits, auto-return to home, semi-autonomous motions, and line tracking Referring again to FIG. 1, an exemplary multifunctional hub 105 is shown. Hub 105 serves as a central interface point for an operator and for the system integrator, and can provide a great number of services and facilities at a desired location.

In the exemplary embodiment, hub 105 serves a multitude of communication and support functions. Preferably, the hub 105 is conveniently located for access and visibility by the operator. It is also physically near any tooling or end-effector added to the system by a user or system integrator. Hub 105 generally contains an embedded computational node 106 capable of digital communication, and analog and digital support circuitry. In a preferred embodiment the computational element is a Atmel model AT90S85535-8JC Microcontroller.

According to the described exemplary embodiment, the functions of the hub 105 can include providing physical support to tooling 111 and its payload, routing pneumatic and electrical power from overhead supplies to tooling 111, measuring the weight supported via a flexure and strain gauges. Furthermore, the hub 105 can display IAD status to the operator via indicator lights 115, provide “soft” (user-programmable) indicators 115, allow operator control of IAD state by providing accessible switches, providing "soft" (user-programmable) switches as well, making possible an emergency-stop button local to operator; providing a digital input for other e-stop triggers or switches, accepting analog or digital input from any of a number of intent sensors, such as (proportional) inline handle, (proportional) pendant handle, up/down switches, force sensors, and so forth, allowing operator selection of preferred "profile" to customize tuning and "feel" of the IAD to individual preferences.

Moreover, the hub 105 can accept input from user-supplied sensors on the tooling 111, such as proximity switches, operator buttons, interlocks, providing outputs to user-supplied actuators or indicators on the tooling, such as solenoids, motors, indicator lamps, air valves, etc. The hub 105 can support extensive user-programmed logic involving the actuators 112, sensors 113, and IAD state. Additionally, the hub 105 can allow serial or parallel communication with a user-supplied computer 110 or PDA for the purpose of user-programming of IAD behavior, logic functions, and profile programming, passing this communication to the node 106. The hub can communicate with the node 106 via serial or parallel communication, thus reducing wire-count and associated reliability problems. Electrically isolate the tooling 111 from the wire-rope or other support. Inject an excitation current into a wire rope support, for detection by a cable-angle-sensor. Allow free swiveling of the supporting wire-rope or chain or other support with respect to the tooling 111 and hub 105.

The above described functions of hub 105 will become more clear in the description of its construction below, describing mechanical and electronic components. Achieving these functions from the construction detailed below can be accomplished by those skilled in the arts of mechanical construction and electronic design.

Figure 2:
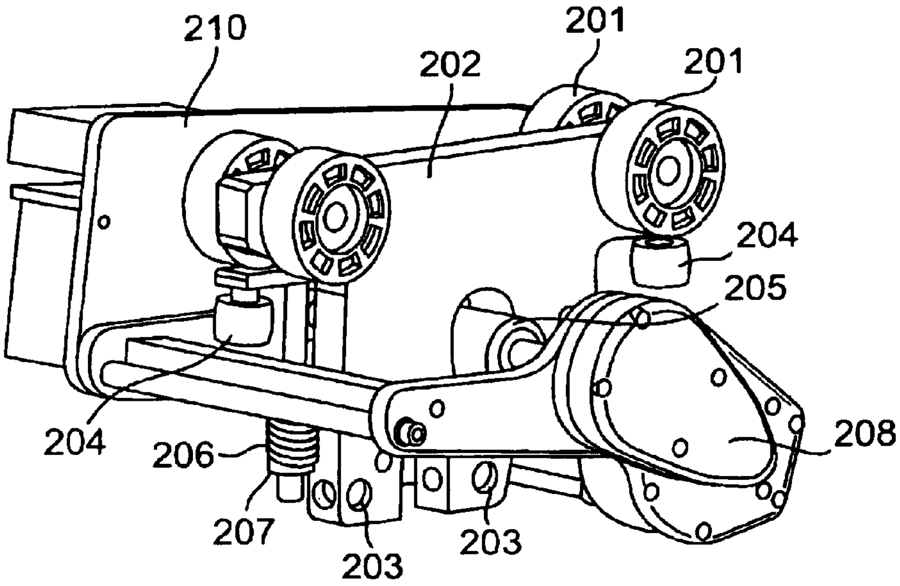
FIG. 2 is a diagram illustrating a perspective view of the exemplary trolley module of FIG. 1.

FIG. 2 is a drawing illustrating the exemplary trolley 101 of FIG. 1. A multiplicity of wheels 201 roll freely in enclosed track of known type or on an exterior of I-beam type rail (not shown). Preferably, wheels 201 rotate freely, supported into load plate 202 by bearings in a conventional way. Mounting holes 203 on the lower side of load plate 202 allow the connection of a lift or balancer or rail or other load to load plate 202, the load being moved by the motion of trolley 101. The dimensions of load plate 202 and of wheels 201 may be varied to adapt trolley 101 to a number of different types of enclosed track or rail. Guide rollers 204 serve to center trolley 101 with respect to the opening in the enclosed track. Guide rollers 204 are also supported into load plate 202 by bearings in a conventional way. Drive roller 205 is driven by a motor and gear train.

Of note, are tensioning spring 206 and manual nut 207. By tightening the tensioning spring 206 with the manual nut 207, a normal force is preferably developed between drive roller 205 and the lower surface of the enclosed track or rail. Thus powered rotation of the drive roller 205 can drive the trolley 101 along the enclosed track or rail. By loosening the manual nut 207, the drive roller 205 may be released from contact with the lower surface of the enclosed track, thus allowing the trolley 101 to regain the ease of motion of passive trolleys in the event of a loss of power or other fault. In an exemplary embodiment, the tensioning spring 206 is tensioned or released manually, however electric or pneumatic or other actuators could also be used to tension or release tensioning spring 206.

FIG. 2 also shows the disposition of gear train of conventional design, which is internal to gear train cover 208. The disposition of back plate 210 is also shown. Electronic components, yet to be described, preferably mount on the back plate 210, and a back plate cover (not shown) can cover and protect the electronic components.

Figure 3:
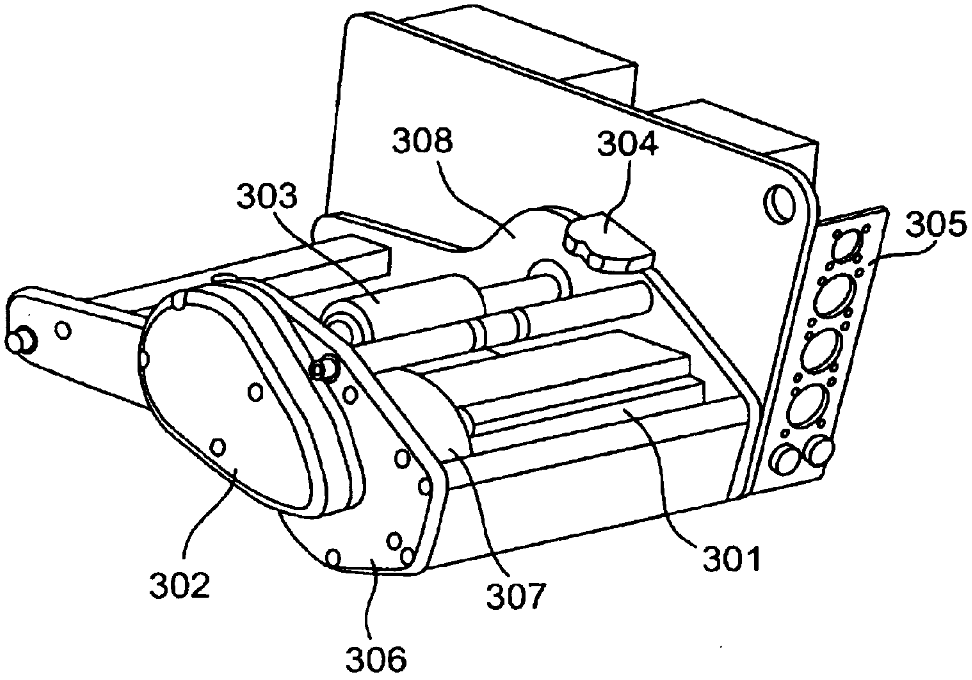
FIG. 3 is another diagram illustrating a perspective view of the trolley module of FIG. 1, with some parts removed for viewing.

FIG. 3 shows a drawing of the exemplary trolley 101 of FIG. 2 without the load plate 202 and the components that attach to it. Illustrated is the disposition of the motor 301, which drives gear train 302 and thus, roller 303. Preferably, the motor 301 includes a direct current (DC) brushless servo motor, but it should be understood that other types of motors including brushed and AC induction motors can also be used. In the exemplary embodiment, index support 304 carries a hall-effect switch which is used to detect a magnet at a known location along the enclosed track. However many other indexing or positioning systems can also be used. Mounting plate 305 is shown, into which connectors, switches, and indicators may be inserted.

Figure 4:
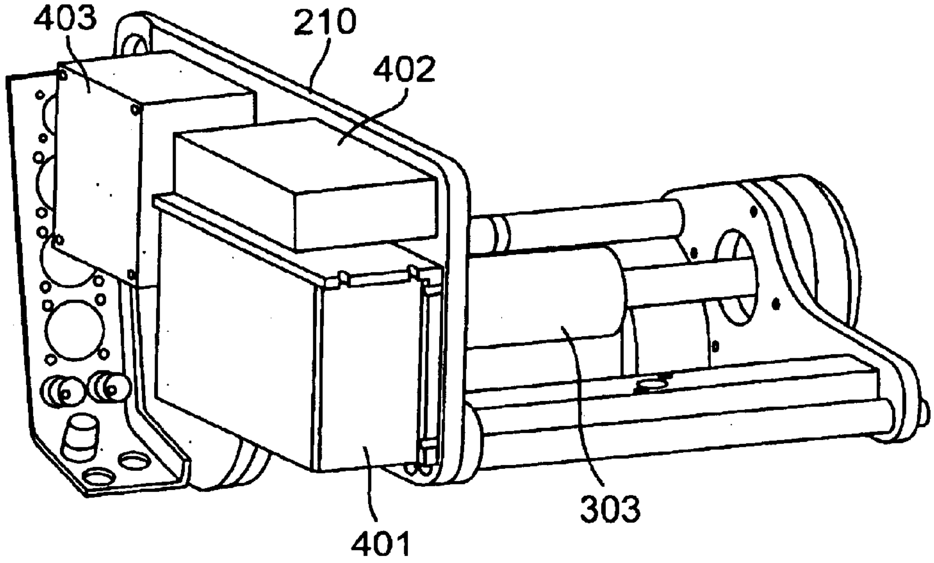
FIG. 4 is yet another diagram illustrating a perspective view of the trolley module of FIG. 1, with some parts removed for viewing.

FIG. 4 shows a drawing illustrating the opposite side of back plate 210, indicating the disposition of several electronic components. The electronic components include a motor amplifier 401, power supply 402, and computational node 403. In the exemplary embodiment these are physically separate components, although integration of two or more of them may be advantageous. Minor components including wiring harnesses, switches, lights, regeneration resistors, and connectors are not shown for purposes of clarity and ease of illustration. In the exemplary embodiment, the motor amplifier 401 is an Advanced Motion Control model B25A20AC, power supply 402 is a Total Power International model TPG65-31A, and computational node 403 is a PC-104 stack consisting of JumpTec MOPS/586 and Diamond Systems DIAMOND-MM-AT, as well as a Signal Conditioning board for minor analog and digital interface and filtering actions.

Figure 5:
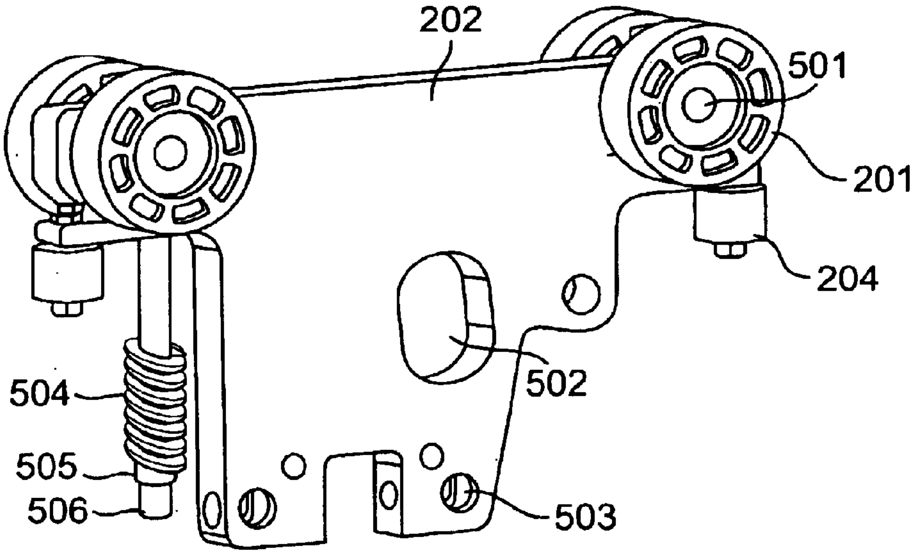
FIG. 5 is a diagram illustrating an exemplary passive trolley components of the trolley module of FIG. 1, and the manual release mechanism.
Figure 6:
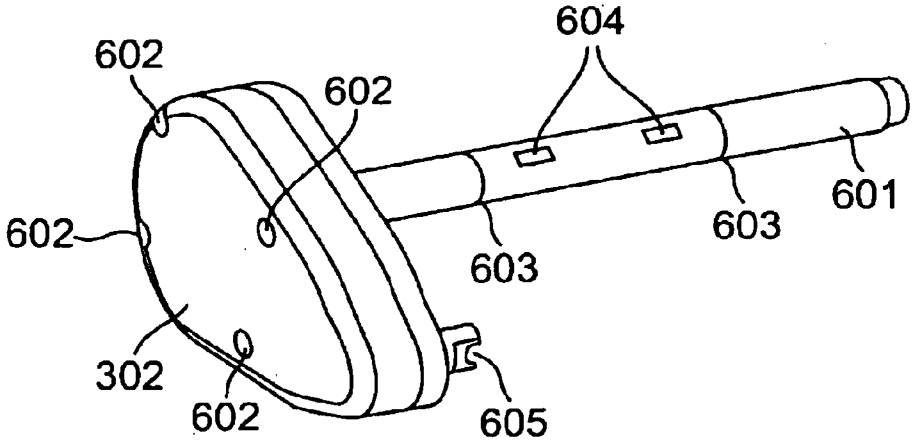
FIG. 6 is the gear train housing and roller shaft.

FIG. 5 shows the load plate 202 with wheels 201 and guide rollers 204 of the trolley 101 of FIG. 2. Preferably, the guide rollers 204 are rotatably attached to load plate 202 by journal bearings internal to guide rollers 204. Wheels 201 are attached to load plate 202 by axle 501 which are rigidly attached to the wheels 201, the axle 501 is rotatably attached to load plate 202 by ball bearings internal to load plate 202. Hole 502 allows space for drive roller 205. Mounting holes 503 allow for a connection of a load (not shown). Tensioning spring 504 and manual nut 505 are shown on tensioning rod 506. As described above with regard to tensioning spring and manual nut (206 and 207 in FIG. 2, respectively), by tightening the tensioning spring 504 with the manual nut 505, a normal force is preferably developed between drive roller 205 and the lower surface of the enclosed track or rail. Thus powered rotation of the drive roller 205 can drive the trolley 101 along the enclosed track or rail. By loosening the manual nut 505, the drive roller 205 may be released from contact with the lower surface of the enclosed track, thus allowing the trolley 101 to regain the ease of motion of passive trolleys in the event of a loss of power or other fault FIG. 6 shows a drawing illustrating an exemplary gear train cover 302 having a gear train. In the exemplary embodiment, the gear train is a two-stage spur gear transmission providing a reduction ratio of 4:1, such that the torque of motor 301 is increased by that factor in application to drive roller 303.

Gear box 302 and drive shaft 601 connects to the front plate 306 with four screws 602 that may be easily inserted or removed. Removal of these four screws 602 permits removal of the subassembly and provides convenient access to drive roller 303, as may be necessary to repair a worn drive roller, or for preventive maintenance of a drive roller. Ease of subassembly removal is facilitated by a tongue-in-groove connection from flywheel/coupler 702 to input shaft 605, and also by a slip-fit connection from the end of the drive shaft 601 to the bearing 308 (FIG. 3). Preferably, drive roller 303 is fixed coaxially to drive shaft 601. In the exemplary embodiment, the drive roller 303 is fixed to drive shaft 601 via retaining rings 603 and woodruff keys 604, permitting easy removal and replacement. Preferably, the drive roller 303 is a 90A durometer polyurethane-coated aluminum cylinder (coating ¼ inch thick), although many other kinds of wheel or roller could be used.

Figure 7:
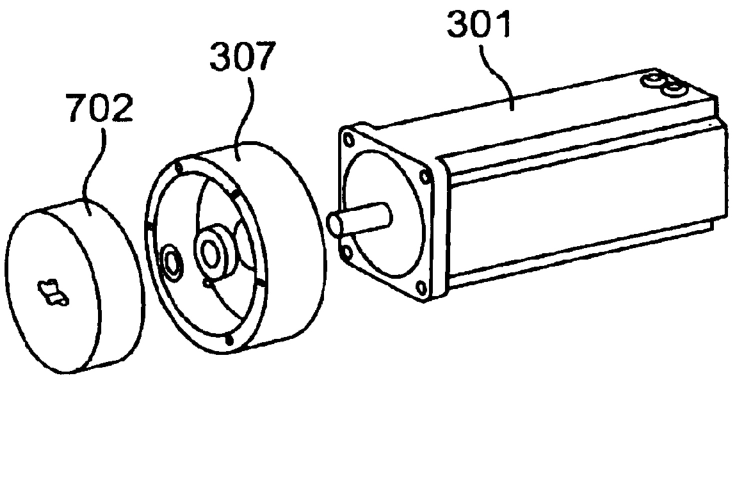
FIG. 7 is a diagram illustrating an exemplary motor and flywheel assembly.

FIG. 7 shows a drawing illustrating an exemplary flywheel 702, which is rigidly fixed to shaft of motor 301 and enclosed in housing 307. Flywheel 702 serves to provide inertia matching between motor 301 and the mass of the load driven by trolley 101. Inertia matching is a technique known in the field of servo control to facilitate robust, parameter-insensitive feedback control systems.

Figure 8:
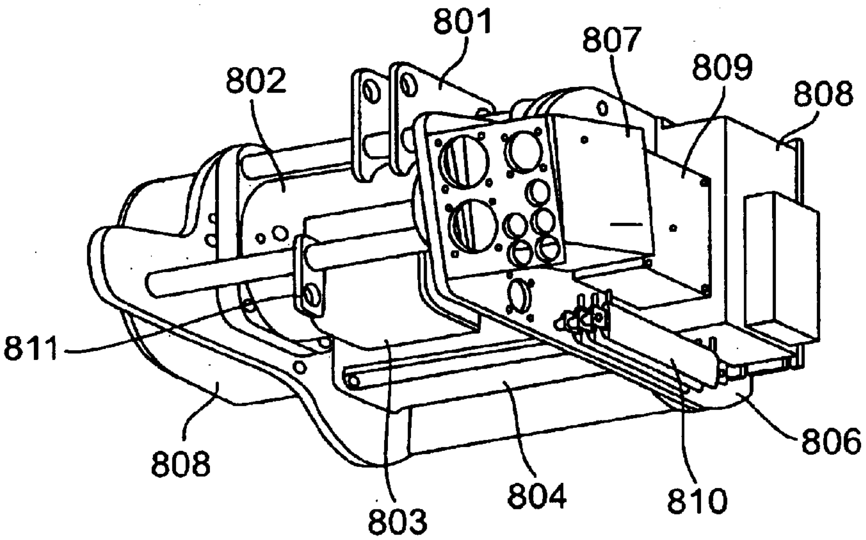
FIG. 8 is a diagram illustrating a perspective view of the exemplary lift module of FIG. 1.

FIG. 8 shows a diagram illustrating the lift 103 of FIG. 1. The hanger 801 is used to connect the lift 103 to the trolley 101, or to any other kind of movable or non-movable support. Preferably, the reel casing 802 pays out wire rope from which a payload may be suspended via hub 105. The wire rope (not shown) passes through field-replaceable guide 803. Motor 804 drives a reel within Reel Casing 802, which will be further described below, via a gear train within Gear Train Housing 805. Several electronic components mount on back plate 806, which is enclosed by a back plate cover, not shown. The electronic components generally include computational node 807, amplifier 808, and power supply 809. In the exemplary embodiment, these are physically separate components, although integration of two or more of them may be advantageous.

Minor components include Regeneration Resistors 810, and also wiring harnesses, switches, lights, and connectors which are not shown. Regeneration Resistors 810 dissipate energy that is generated when the suspended payload is moved downward.

In the exemplary embodiment motor amplifier 807, 808, and 809]is an Advanced Motion Control model B25A20AC, Power Supply 402 is a Total Power International model TPG65-31A, and Computational Node 403 is a PC-104 stack consisting of JumpTec MOPS/586 and Diamond Systems DIAMOND-MM-AT, as well as a signal Conditioning. The attachment 811 can be utilized to produce a "reeved" cable. Reeving is a technique, well-known in the art, for doubling the load capacity of a lifting device (and simultaneously halving the speed capability). For example, according to the described exemplary embodiment, a wire rope cable may be reeved by looping it around a pulley and securing the free end to the reeve attachment. The load is then attached to a shaft passing through the center of the pulley.

Figure 9:
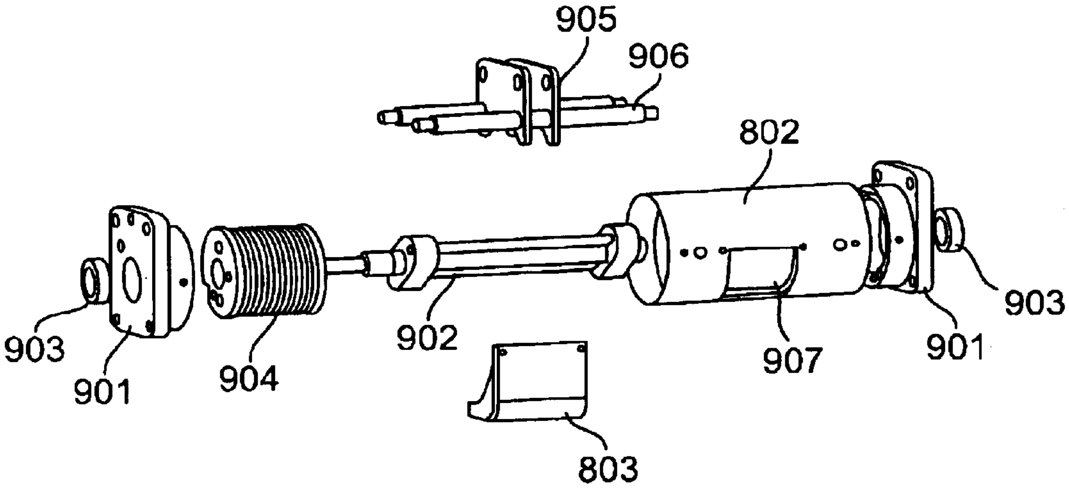
FIG. 9 is a diagram illustrating an exploded view of the exemplary reel assembly of the lift of FIG. 8.

FIG. 9 shows more detail of an exemplary reel casing and its contents. End plates 901 are rigidly affixed to the body of lift 103. Torque unit 902 is rotatably connected to end plates 901 via bearings 903. Motor 804 drives torque unit 902 via gear train (not shown) within gear train housing 805. Reel 904 is turned by torque unit 902 and is slidably connected to torque unit 902 by plastic sleeves. Thus rotation of reel 904 is driven by motor 804, but reel 904 is able to translate freely along torque unit 902. Also shown is hanger 905 and hanging rods 906, which mount rigidly to end plates 901. Also shown is guide 803 which will be disclosed in detail below. Guide mounts to an opening 907 in reel casing 802.

Figure 10:
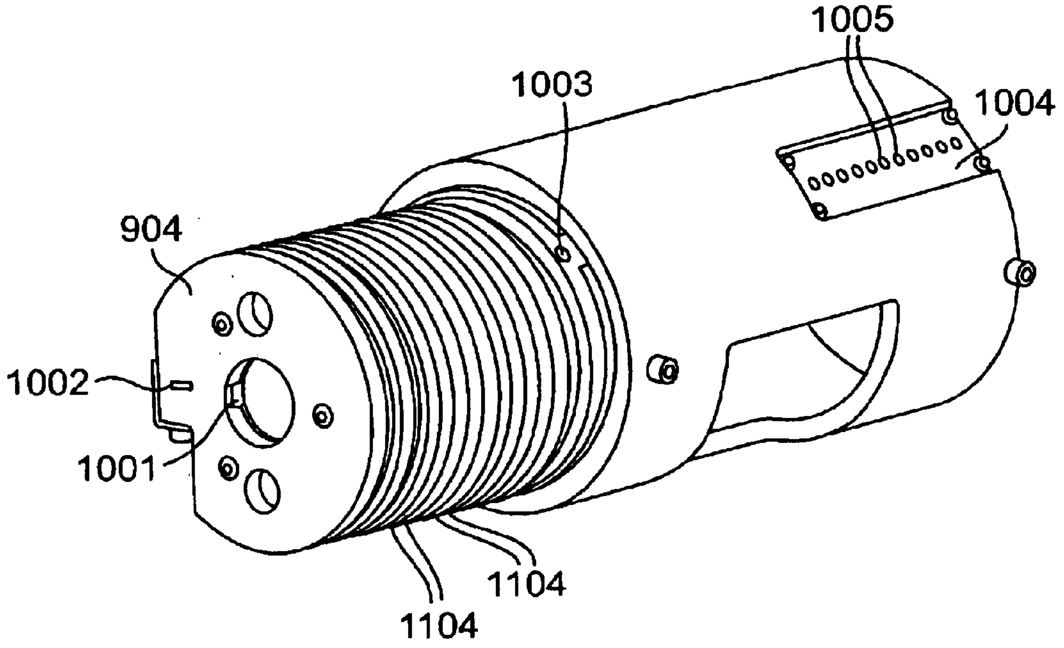
FIG. 10 is a diagram illustrating in greater detail the reel and electrical components of FIG. 8.

FIG. 10 shows further detail of contents of reel casing 802 of FIG. 9. A conventional spring-loaded carbon brush 1001 (e.g., such as used in brushed motors), is located in slot 1002 in order to make electrical contact from reel 904 to torque unit 902. Brush 1001 is needed in order to providing a grounding path for an excitation current used for a cable angle sensor. FIG. 10 also shows index magnet 1003 and hall switch assembly 1004. Preferably, one of the multiplicity of hall switches 1005 on hall switch assembly 1004 will be closed, when index magnet 1003 approaches. Thus, it is possible to disambiguate the multiple revolutions of reel 904 and determine through the use of an index pulse the absolute rotation of reel 904.

Figure 11:
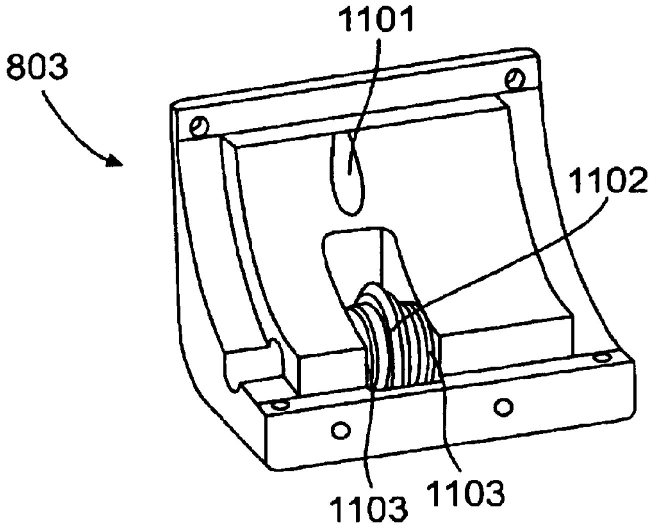
FIG. 11 is a diagram illustrating the exemplary replaceable guide assembly of the lift of FIG. 1.

FIG. 11 shows an exemplary guide 803 of FIG. 8. The guide 803 includes an exit hole 1101 through which wire rope (e.g., from which a payload is suspended) exits from the lift 103 (FIG. 1). In an exemplary embodiment, guide 803 can be considered a replaceable part, since wear is expected at a similar rate to wear of the wire rope. Guide 803 also includes cam follower 1102, which is rotatably mounted to guide 803 by bearings 1103. Cam follower 1102 engages spiral grooves 1104 in reel 904, and forces reel 904 to translate along torque unit 902 as reel 904 rotates. In this way the end of the portion of aforementioned wire rope, as the wire rope winds or unwinds from reel 904, is always positioned over exit hole 1101.

Figure 12:
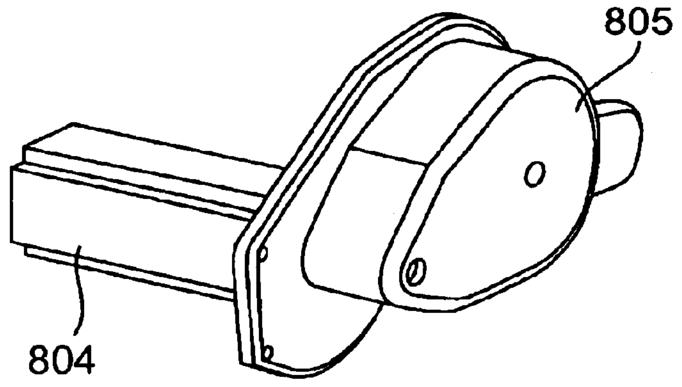
FIG. 12 is a diagram illustrating the exemplary motor and gear train of the lift of FIG. 1.

FIG. 12 shows gear train housing 805 in which a conventional gear train is contained. The gear train consists of a two-stage spur or helical gear transmission with a reduction ratio of 25:1 such that the torque applied to torque unit 902 exceeds that supplied by motor 804 by that same ratio.

Figure 13:
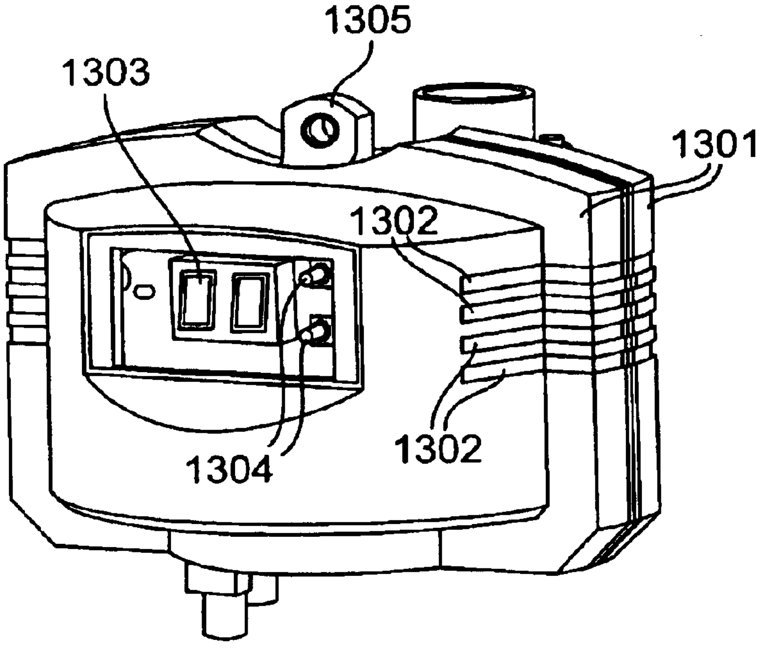
FIG. 13 is a diagram illustrating a perspective view of the front of the exemplary hub component of FIG. 1.

FIG. 13 shows a drawing illustrating the front view of the hub 105. Hub 105 generally includes housing 1301 with slots 1302 through which a multiplicity of status lights 1601 may be seen by an operator. In particular, the status lights 1601 may be used to indicate the modes required by the system safety standard. It further includes display panel 1303, which may be of many known types including light emitted diodes (LEDs) and liquid crystal display (LCD). In the exemplary embodiment, the display panel 1303 includes two LED alphanumeric characters sufficient to display a two-character user profile identifier. Switches 1304 allow the operator to toggle among the profiles. The swiveling attachment 1305 preferably allows the hub 105 to remain facing the operator or any other desired direction, despite rotation of a wire rope or other support from which it is suspended.

Figure 14:
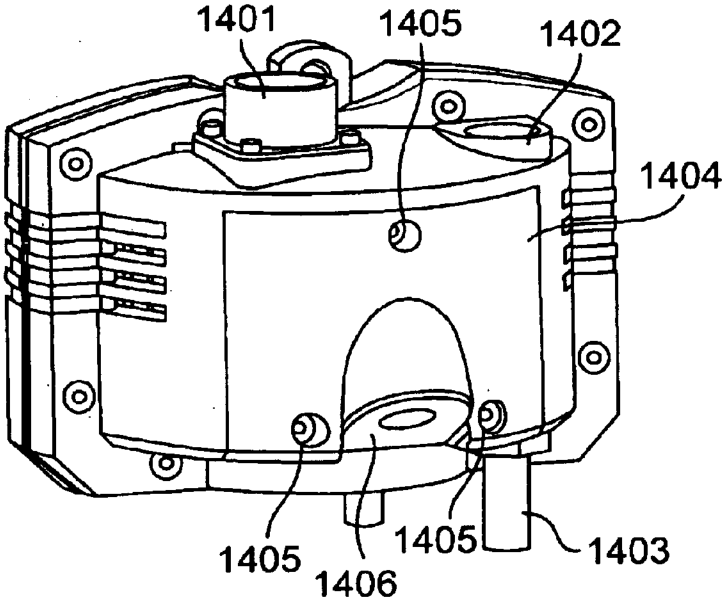
FIG. 14 is a diagram illustrating a perspective view of the rear of the hub of FIG. 1.

FIG. 14 shows a drawing illustrating the exemplary rear view of the hub 105. Electrical connector 1401 preferably connects signals and power to the lift 103 or trolley 101. Air pass-through connectors 1402 and 1403 allow for connection of a pneumatic hose from above to tools or equipment that need pneumatic power below. There is a tube through housing 1301 between connectors 1402 and 1403. Access cover 1404 is secured by user-removable screws 1405, to allow access to an electrical connector 1501 positioned within. Bushing 1406 facilitates strain relief of wiring installed by the user or system integrator.

Figure 15:
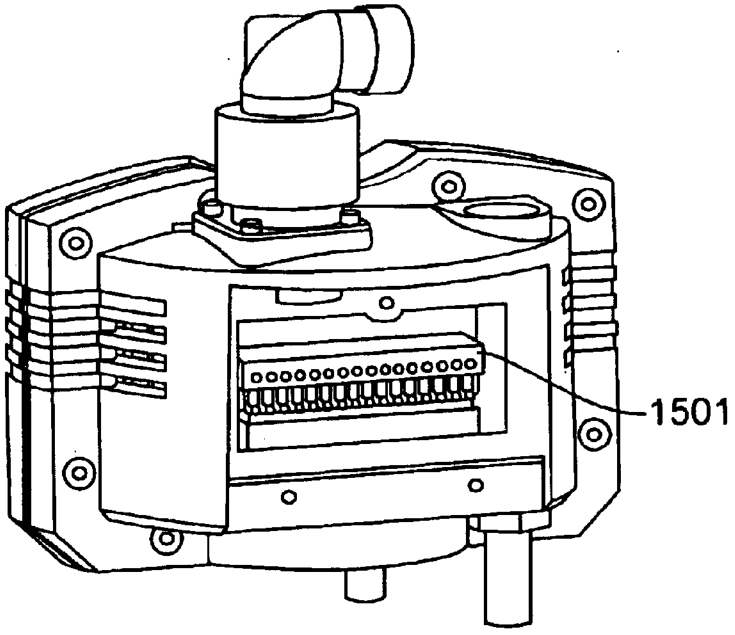
FIG. 15 is a diagram illustrating the rear of the exemplary hub with an access panel removed for viewing.

FIG. 15 shows a drawing illustrating the exemplary rear of the hub 105 with the access panel 1404 removed for purposes of illustration. The electrical connector 1501 is then accessible, allowing access by the user or system integrator to the various I/O lines of computational node 106 which is built into hub 105. In the exemplary embodiment, the electrical connector 1501 is of a two-part design, one part being permanently connected to the printed circuit board of computational node 106, while the other is easily removed for attachment of wiring. In an exemplary embodiment, the connector is a Phoenix Contact terminal block.

Figure 16:
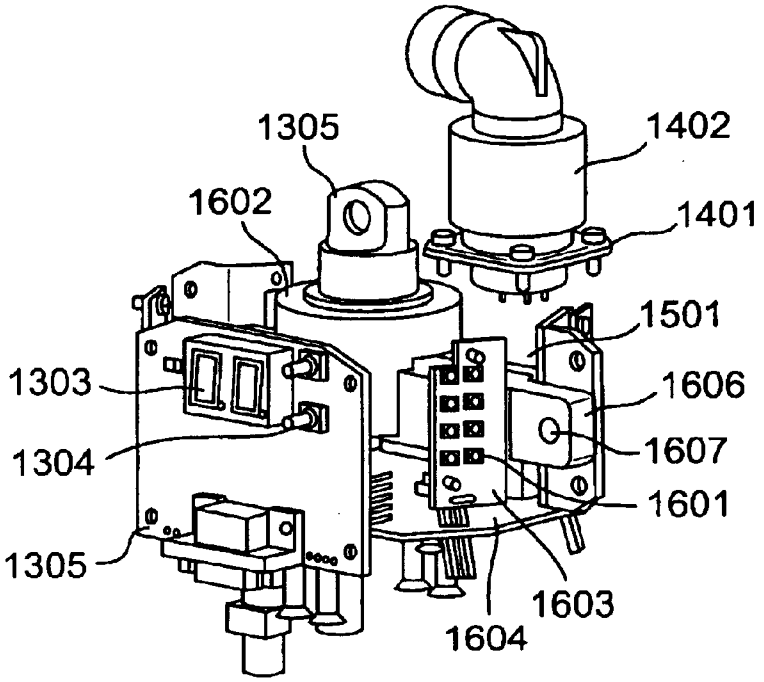
FIG. 16 is a diagram illustrating a perspective view of the internal components of the hub of FIG. 1.

FIG. 16 shows a drawing illustrating an exemplary cutaway of the hub 105. Electrical connector 1401 is shown with a typical mating connector and strain relief 1402. Swiveling attachment 1305 is now more visible; the attachment is allowed to turn freely by a bearing inside of housing 1602, which will be shown in more detail in a subsequent figure. Preferably, a multiplicity of indicator lights 1601 are mounted on a light board 1606 which is in turn electrically connected to lower board 1604. Connector 1501 can be soldered to the lower board 1604. Display 1303 and switches 1304 are preferably soldered to the front board 1605, which is also electrically connected to lower board 1604. Also attached to front board 1605 is a connector for communication with a user-supplied computer or PDA. In the exemplary embodiment the connector is a male DB-9 type connector, although many other types of connectors or channels of communication could be used, such as Ethernet or infrared or radio frequency (wireless). Flexure 1606 conveys load from attachment swivel 1305 to housing 1301 via pins at 1607, and thence to a lower attachment point, so that a measurement of flexing of flexure 1606 is a measure of the load.

Figure 17:
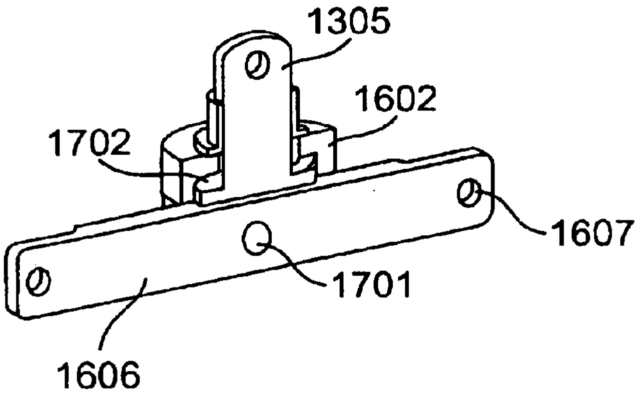
FIG. 17 is a diagram illustrating a cross sectional view of the load cell and swivel assembly of the hub of FIG. 1.

FIG. 17 shows diagram illustrating an exemplary cutaway view of flexure 1606. A pin at 1607 connects the flexure to housing 1301, and a pin at 1701 connects said flexure to housing 1602. Strain gauges are attached to flexure 1606 in a conventional way. Housing 1602 also contains a thrust bearing 1702 which can allow rotation of swiveling attachment 1305, while also securely trapping it in the event of failure of the bearing.

Figure 18:
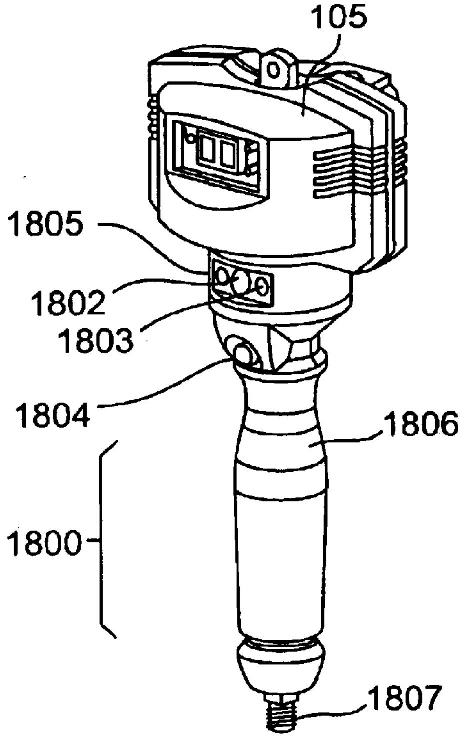
FIG. 18 is a diagram illustrating a perspective view of the hub attached to the inline handle module.

FIG. 18 shows a diagram illustrating an exemplary inline handle 1800 connected to the bottom of hub 105 via a locking mechanism. Inline handle 1800 incorporates a multiplicity of switches such as a stop button 1802, restart button 1803, float enable button 1805, and a user-programmable "Soft Button" 1804. The sleeve 1806 may be grasped by the user and moved up or down to signal the intent of the user for up or down motion. Optionally, the inline handle 1800 may be removed from the hub 105 and other intent sensors 109 may be used, such as the pendant handle 2200, disclosed more below. In an exemplary embodiment, inline handle 1800 is used. Also shown is the threaded connector 107 to which a payload or tooling may be attached. Up/down motion of sleeve 1806 is detected by an analog Hall sensor of type A3515EUA made by Allegro Microsystems of Worcester, Mass. Of course, there are many other ways of measuring up/down motion.

In the exemplary embodiment the inline handle 1800 can swivel with the hub 105, and sleeve 1806 can turn freely with respect to the body of inline handle 1800, in order to minimize torque on the operator's wrist. One or more soft buttons 1804 is located on rotatable sleeve 1806 and therefore remain fixed relative to operator's hand even if the hub 105 rotates. A second stop button 1802 is located on the opposite side to ensure accessibility regardless of handle orientation.

Figure 19:
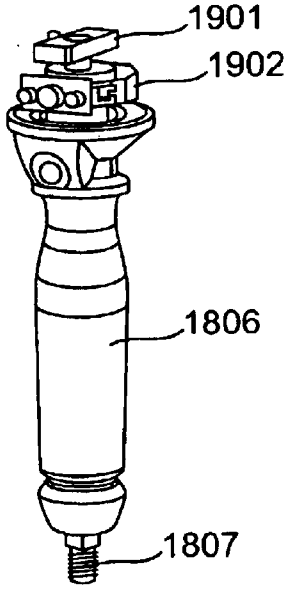
FIG. 19 is a diagram illustrating a perspective view of many of the internal components of the inline handle of FIG. 18.

FIG. 19 shows a diagram illustrating an exemplary cutaway view of the handle 1800, in particular showing locking mechanism 1901, which inserts into the bottom of hub housing 1301, rotates, and locks into place, in order to provide a secure attachment for support of the payload via 1901 and threaded rod 1807. Of course, secure attachments can be made in a variety of ways.

Preferably, ring 1902 in is rigidly fixed to sleeve 1806 and coveys the motion of the sleeve to aforementioned analog hall sensor, via a mechanism described below.

Figure 20A:
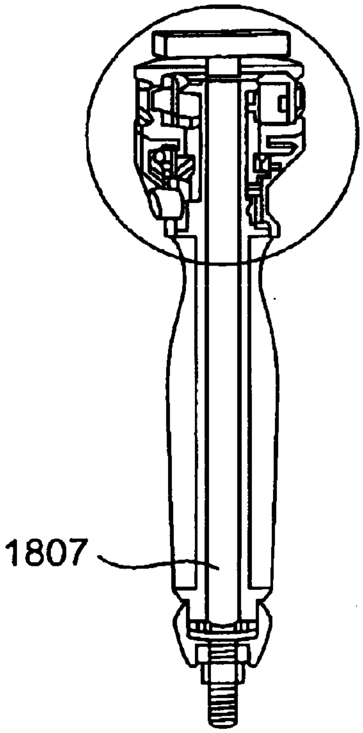
FIGS. 20*a* and 20*b* are diagrams illustrating a cutaway view of the internal components of the inline handle of FIG. 18.
Figure 20B:
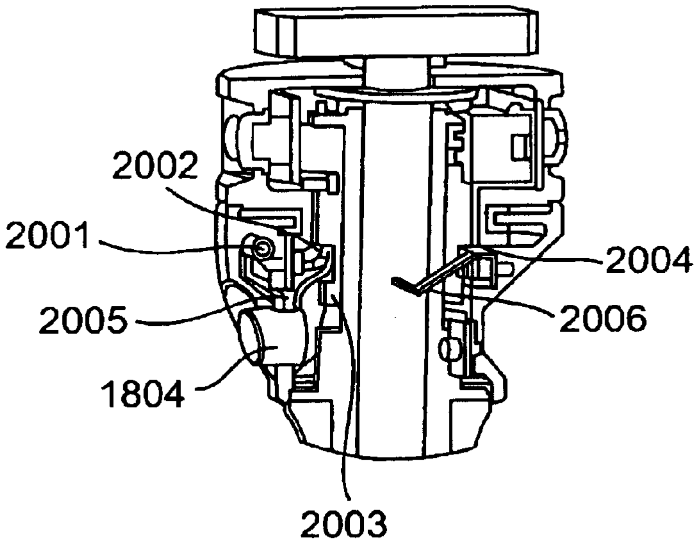

FIG. 20 shows a diagram illustrating the exemplary mechanism by which activation of the soft button 1804 is conveyed to an electrical switch despite rotation of the button. Soft button 1804, when pushed, causes rotation of lifter 2005 which is pivotably attached at 2001. Finger 2002 of lifter 2005 therefore rises, lifting ring 2003 which is slidably connected to and concentric with rod 1807. Arm 2006 of microswitch 2004 rides in a grove of ring 2003, and so motion of the ring closes switch 2004.

Figure 21:
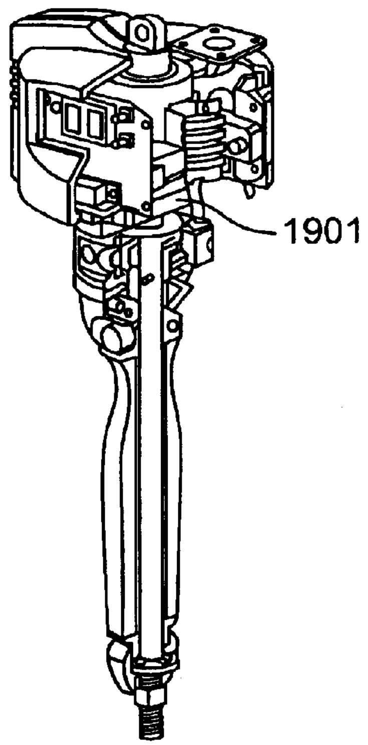
FIG. 21 is a diagram illustrating a cut away view of many of the internal components of the inline handle of FIG. 18.

FIG. 21 shows a diagram illustrating the locked orientation of the exemplary locking mechanism 1901 when it is inserted into hub housing 1301, rotated, and locked in place.

Figure 22:
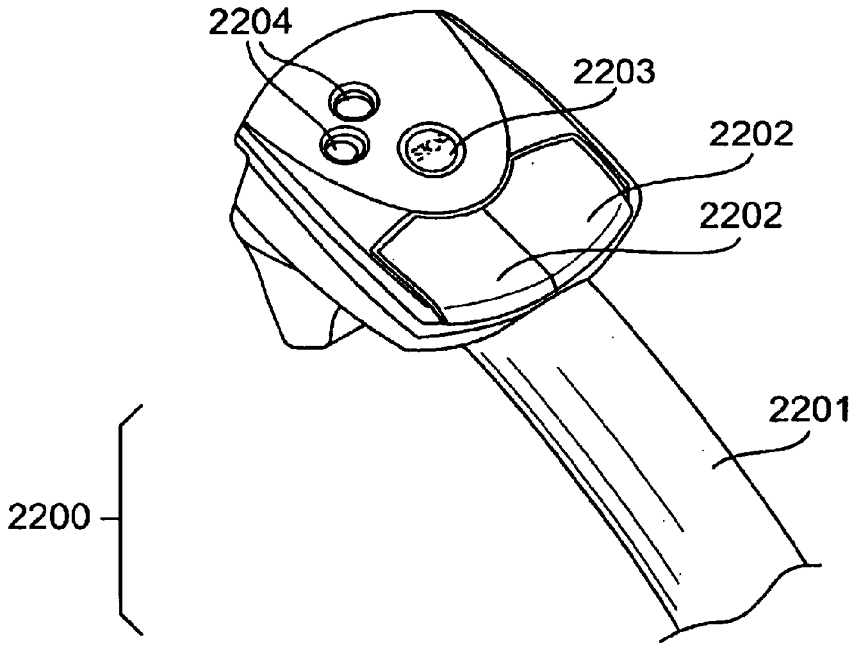
FIG. 22 is a diagram illustrating a perspective view of the pendant handle module.

FIG. 22 shows a diagram illustrating an exemplary pendant handle 2200 which is one of several possible intent sensors 109 (FIG. 1). The pendant handle 2200 generally includes a comfortable grip 2201 and two proportional buttons 2202 which may be used for up and down functions, or other functions. The stop button 2203 is can also be used for stop functions, or other functions. Also, restart and float enable buttons 2204 can be used for restarting functions or changing modes of operation functions, respectively.

Figure 23:
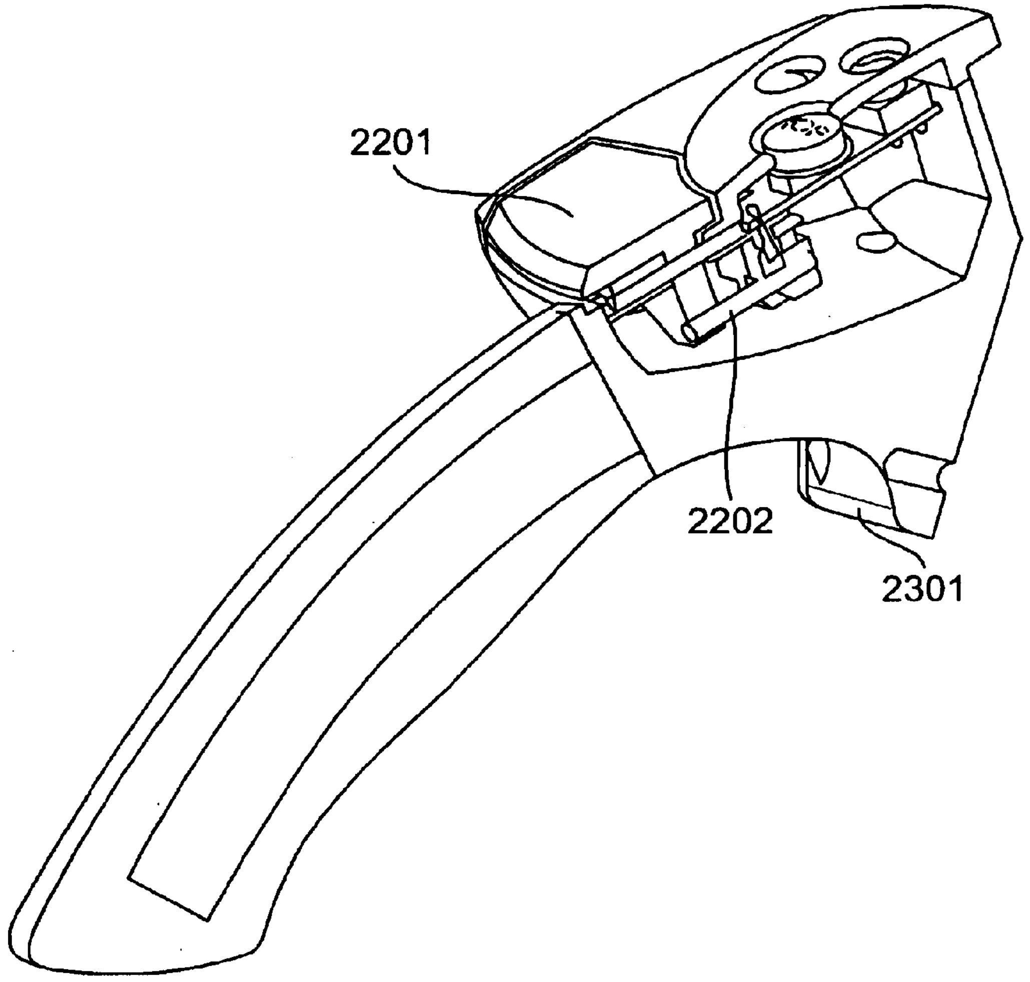
FIG. 23 is a diagram illustrating a cutaway view of many of the internal components of the pendant handle module of FIG. 22.
Figure 24:
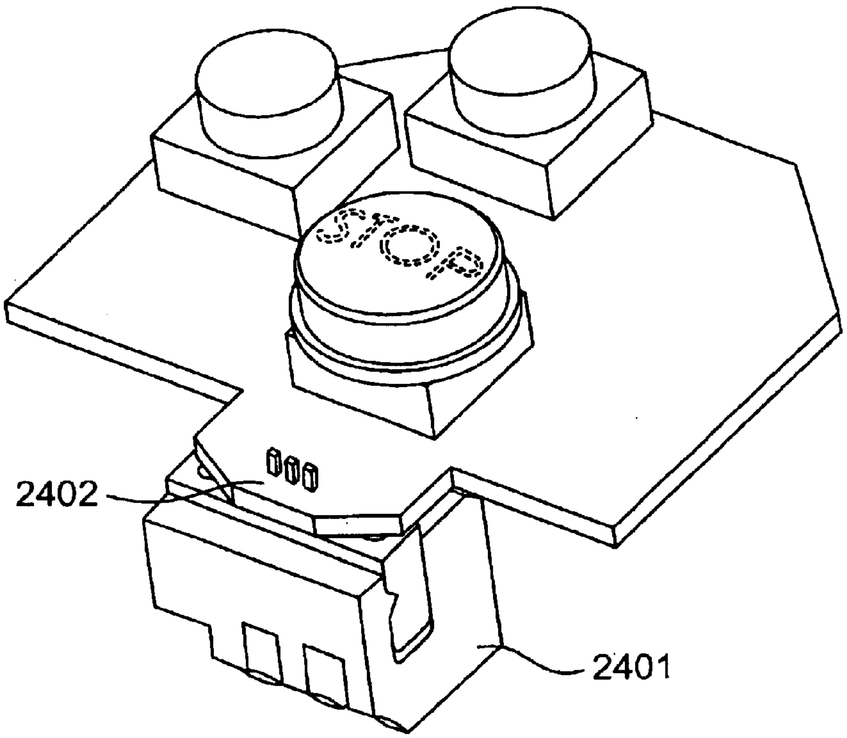
FIG. 24 is a diagram illustrating a perspective view of a circuit board carrying switches and a hall sensor assembly positioned within the pendant handle of FIG. 22.
Figure 25:
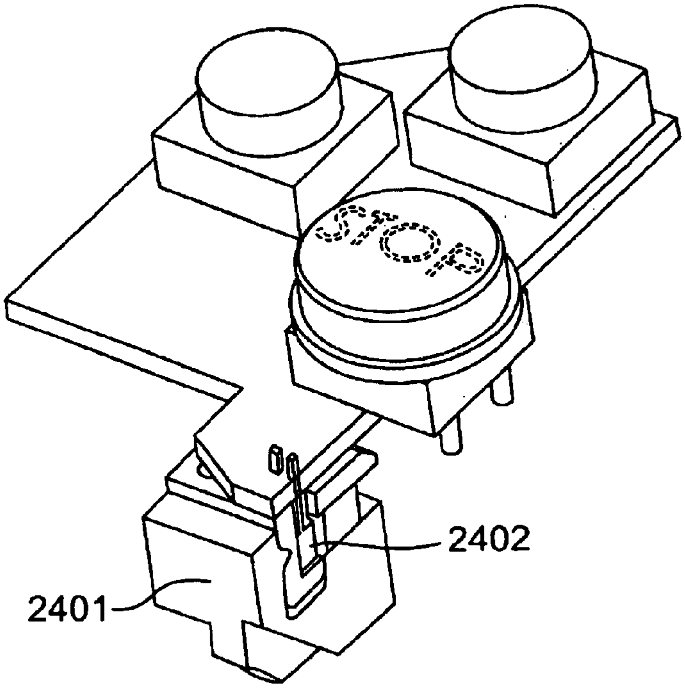
FIG. 25 is a diagram illustrating a cross section of the inside of the hall sensor assembly of FIG. 24.

FIG. 23 shows a diagram illustrating an exemplary cutaway view of the pendant handle 2200, and illustrates bushing 2301 through which a cable to hub 150 exits with strain relief. Within pendant handle 2200 there are a multiplicity of conventional buttons which may be assigned standard or application specific functions. Rocking of proportional buttons 2201 results in rotation of shaft 2202 which moves a magnet in the vicinity of a hall sensor in order to create a proportional output signal that can be used for FIGS. 24 and 25 show an exemplary slider 2401 which can carry a magnet. The slider 2401 is displaced by rotation of shaft 2200, moving the magnet by hall sensor 2402, which in a preferred embodiment is an Allegro model A3515EUA. In a preferred embodiment, slider 2401 and hall sensor 2402 are the identical components as are used in the in-line handle.

FIGS. 26–34 show screen-shots illustrating several different aspects of an exemplary graphical user interface of configuration software which resides on user-supplied computer 110 (FIG. 1). The configuration software may be used to configure an intelligent assist device and to adjust its properties. In an exemplary embodiment, the graphical user interface and underlying algorithms are programmed in Borland C++ Builder.

Figure 26:
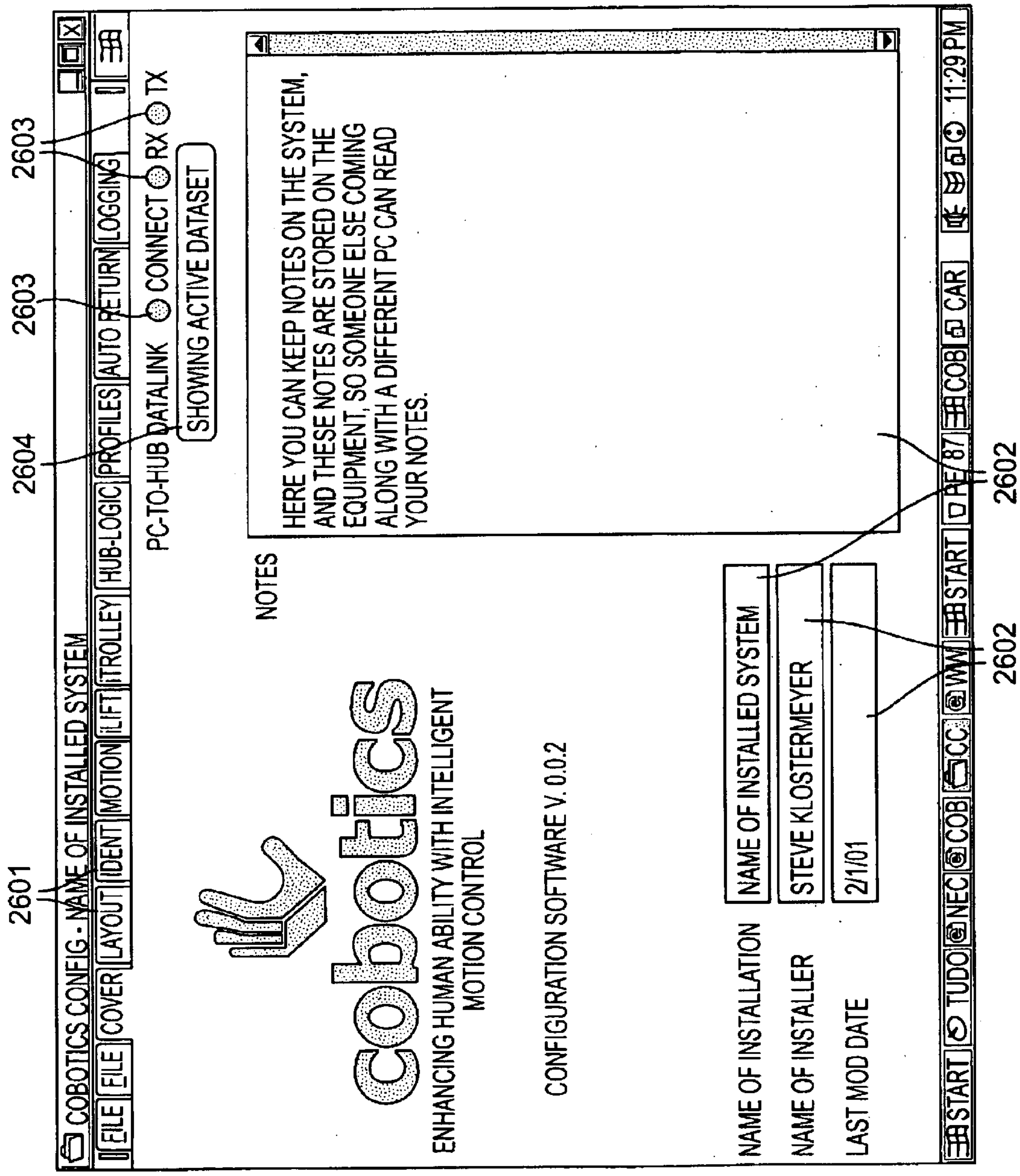
FIG. 26 is a screen-shot illustrating the cover page of the graphical user interface (GUI) of the configuration software module.

FIG. 26 shows an exemplary cover panel for the graphical user interface software. In an exemplary embodiment, a multiplicity of tabs 2601 allow access to subsequent panels, to be described below. Of course, many other interface conventions, well-known in the art, may be used. Of note are text fields 2602 which an operator, such as a technician or installer, may use for communication with other operators working on the same intelligent assist device (IAD), because the contents of the text fields are stored on the computational nodes 102 or 104 of the IAD itself. Thus, users may communicate via the IAD without the need for other forms of exchange of media or notes. In an exemplary embodiment, information in all fields on all panels of the software reflect data that is stored in the IAD, so that different users with different computers may work on the same IAD, communicating through it, without need for sharing files or computers. Electronic maintenance of notes also allows a history or log of the operator notes or exchanges to be easily maintained. A review of the correspondence history can tell an operator or maintenance personnel any issues which may have occurred with the machine.

Several features may be common to all subsequent panels, and so are described now once. Virtual indicators 2603 preferably show the presence or absence of a live connection from the user-supplied computer to hub 105 of the IAD. Two of said virtual indicators 2603 show the transfer of data from and to the hub 105, respectively. The dataset select button 2604 indicates to the user that changes to fields within the panel are applied to one of two datasets, which are named the Offline dataset and the Active dataset. The user may toggle data select button 2604 to alternate between display of the two datasets. Upon initial connection of the Software to the IAD, all IAD data is preferably downloaded to the Active dataset. Changes made to the Active dataset are uploaded immediately to the IAD. Thus, according to this embodiment changes cannot be made to the Active dataset when the Software is not connected to the IAD. The user may make changes to the Offline dataset when the software is not connected to the IAD. There are facilities for transferring fields between the Offline and Active datasets, and for writing or reading datasets to and from files, and other facilities which have become standard in the art.

Figure 27:
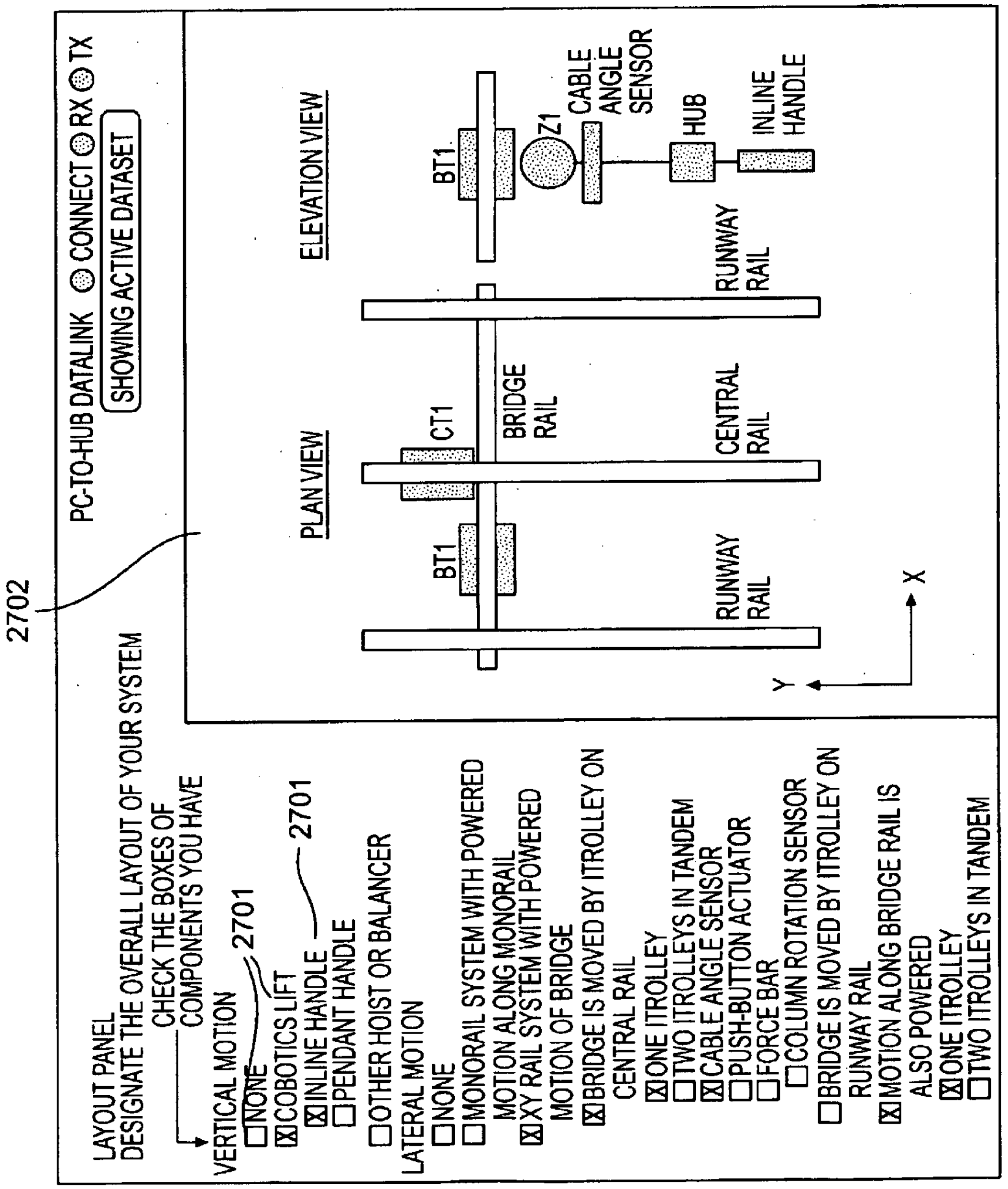
FIG. 27 is a screen-shot illustrating the layout panel of the GUI of FIG. 26.

FIG. 27 shows an exemplary layout panel, in which an installer specifies which components of the modular architecture are in use in a particular installation of an IAD. On the left side of the layout panel are a list of modules that can be used to create the IAD system. Of course, the modules in FIG. 27 are merely exemplary and greater or fewer modules may be used. According to the particular application, the user can check boxes 2701 to select installed modules to create an appropriate IAD system. As each box is checked, a corresponding icon appears in the layout drawing 2702 giving the user a visual indication of the particular system that is being configured.

Figure 28:
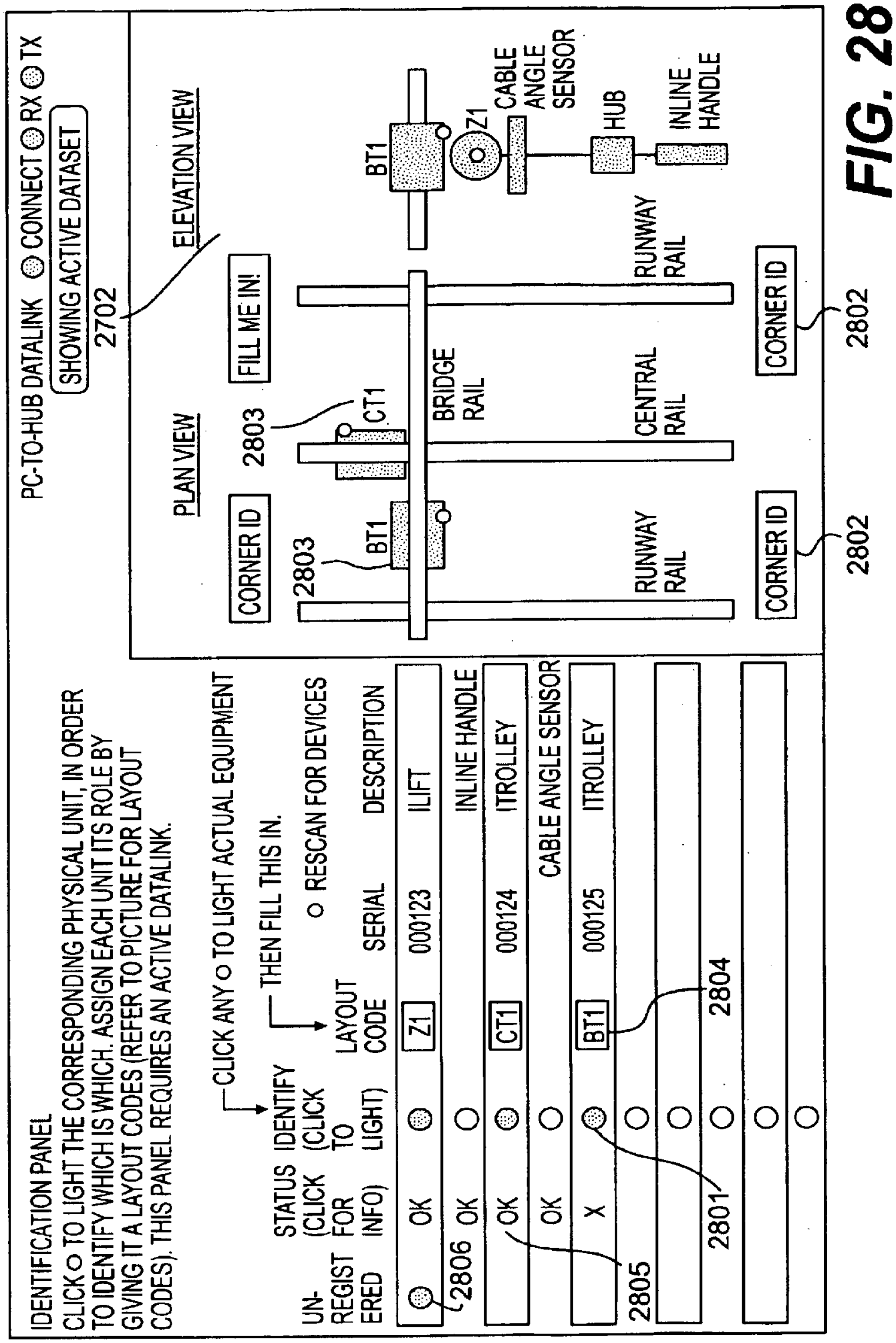
FIG. 28 is a screen-shot illustrating the identification panel of the GUI of FIG. 26.

FIG. 28 shows an exemplary identification panel, in which the installer identifies which modules are to perform which role in the IAD system. The necessity of this step is that there may be several modules of the same kind, for instance two trolleys, used in different physical locations within an IAD installation. For instance one trolley may be on a runway rail and another one on a bridge rail. Because the modules are connected via communications links in this embodiment, they do not self-discover their physical location, e.g. which one is on which rail. Thus, the installer preferably informs them which role each module is to play, via this panel. The left-hand side of the identification panel is user selectable according to the desired system and the right-hand side graphically depicts the configuration of the system to give the user a visual indication and confirmation of the system.

In operation, the software queries the IAD which reports serial numbers of each module, which are displayed in serial number fields. The installer clicks an on-screen identify button 2801, and an identification lamp on the corresponding physical module lights up. The installer identifies from the layout drawing 2702 which role that physical module plays in the IAD, for instance that it is a runway trolley, and inserts one from among layout codes 2803 into a layout code field 2804. In an exemplary embodiment, the user may simply click on the corresponding module on the layout drawing and the layout code is inserted by the software into the field.

Also in FIG. 28 are corner fields 2802 which the user may employ to note physical landmarks or coordinates on the screen, for the purpose of reorienting themselves or another installer returning to the same IAD later, who may set down his or her portable computer in random orientation with respect to the IAD.

Also shown are status indicators 2805 showing the fault state of any of the modules. By clicking on a status indicator 2805 a report may be requested of the module as to its condition. Also shown is a registration indicator 2806 showing whether each module has been registered with its manufacturer, and thereby reminding the user to do so if he or she has not done so already.

Figure 29:
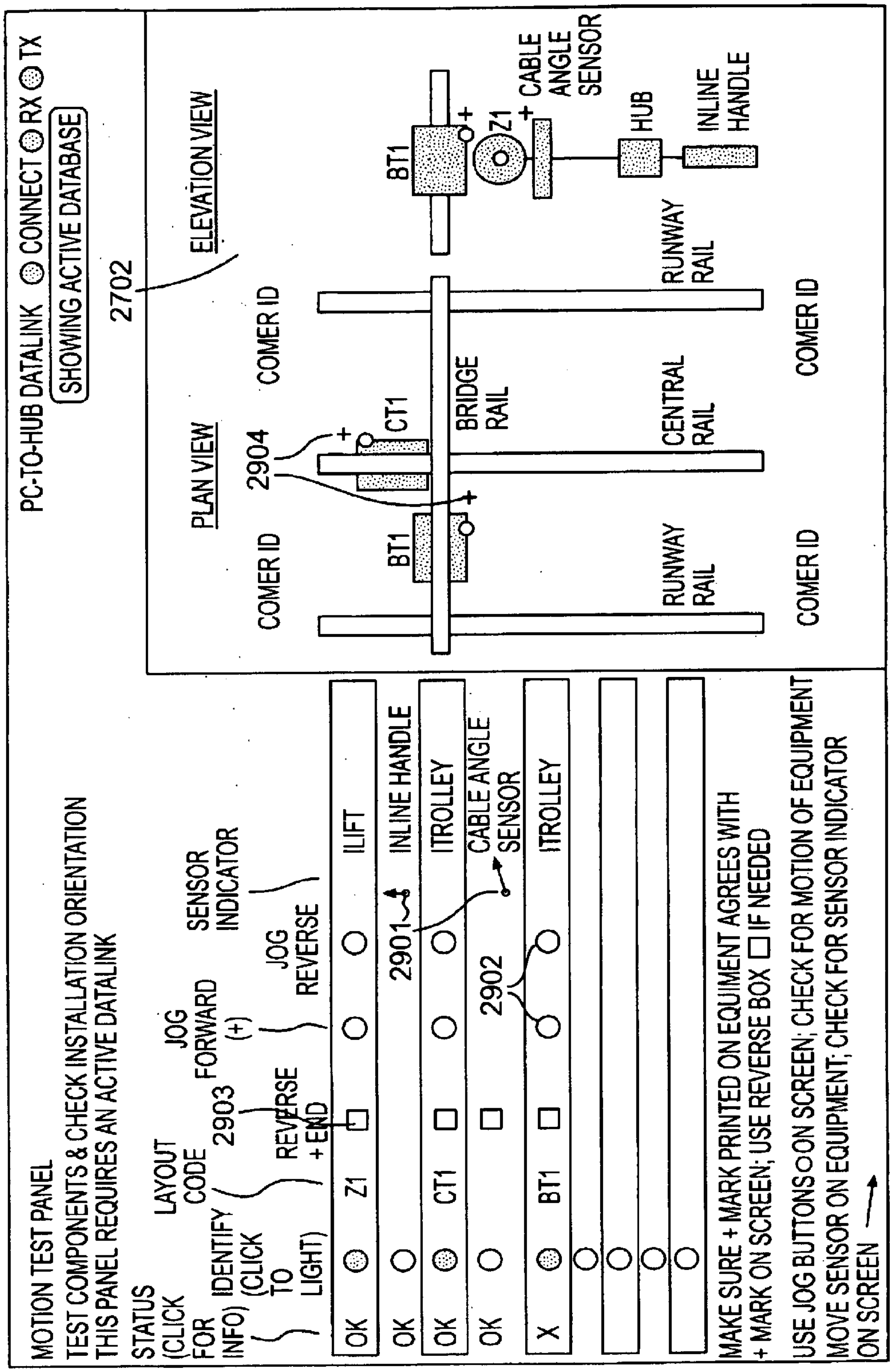
FIG. 29 is a screen-shot illustrating the motion panel of the GUI of FIG. 26.

FIG. 29 shows an exemplary motion panel, which serves to test the functioning of modules of the IAD. Several features from the previous panel also appear here, and will not be described again. Sensor indicators 2901 are animated graphics which indicate the instantaneous output of the various sensors, as communicated from the IAD to the software. This allows the installer to test for proper functioning of sensors. Jog buttons 2902 allow the installer to test for proper functioning of the motion modules such as trolleys and lifts, by clicking on the jog buttons on screen and watching for small motions of the corresponding motion modules. Of note on this panel are reverse boxes 2903 and polarity indicators 2904. These serve to allow the installer to mount the modules (such as trolleys) in either orientation physically, and to inform the software as to the polarity in which they have been installed. Without such a capacity, modules would have to be installed in standard orientation or else IAD motion might occur backwards in operation. Each physical module for which polarity is an issue, such as trolleys and some sensors, has an Orienting Symbol on it; in a preferred embodiment this symbol is a "+". By comparison of the orienting symbol on Layout Drawing 2702 to the orienting symbol on the corresponding physical module, a lack of agreement can be noted. Lack of agreement can be corrected simply by clicking on the reverse button 2903 which changes the location of said orienting symbol in layout drawing 2702.

Figure 30:
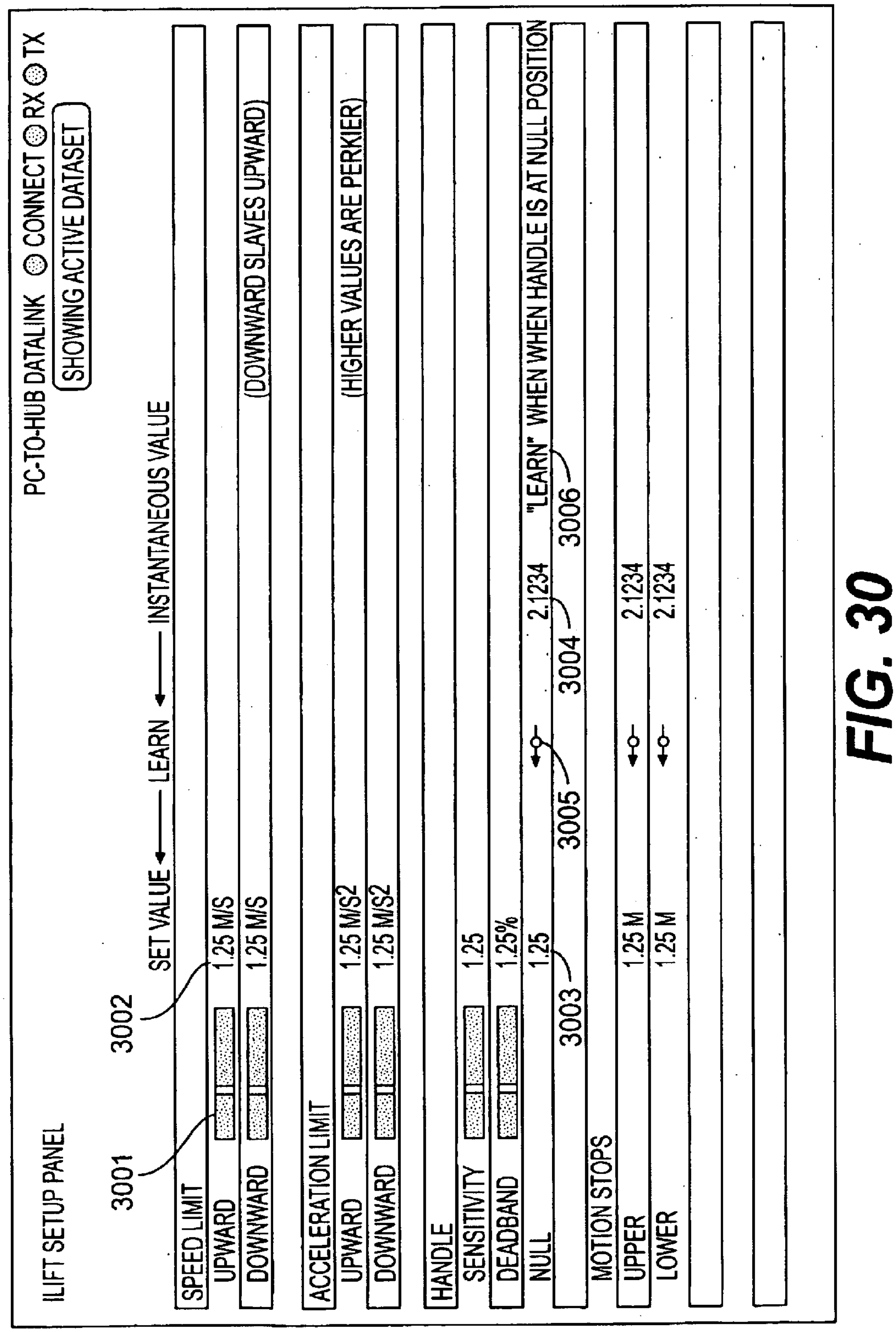
FIG. 30 is a screen-shot illustrating the vertical motion setup panel of the GUI of FIG. 26.

FIG. 30 shows an exemplary vertical motion setup panel, with which an installer or technician or user may adjust the various numerical parameters that determine the behavior of a module such as a lift. In an exemplary embodiment, values may be entered by using a slider such as slider 3001 or by entering a number into a field such as value field 3002. Additionally for certain parameters, such as the null output value of an analog sensor such as Inline Handle 3003, the best value may be obtained from reading an instantaneous value. Such instantaneous value may be transferred directly to value field 3004 by clicking a button such as learn button 3005. The learn button 3005 allows parameters to be recorded so they do not have to be manually determined or entered. FIG. 30 also shows a typical set of parameters, including sensitivities and maximum speeds and limits to motion. Of course other parameters may also appear in such a panel, and not all the parameters shown need appear. Reminder instructions such as 3006 appear in this and other panels. Also there are tool-tips and help pages as have become standard in the art.

Figure 31:
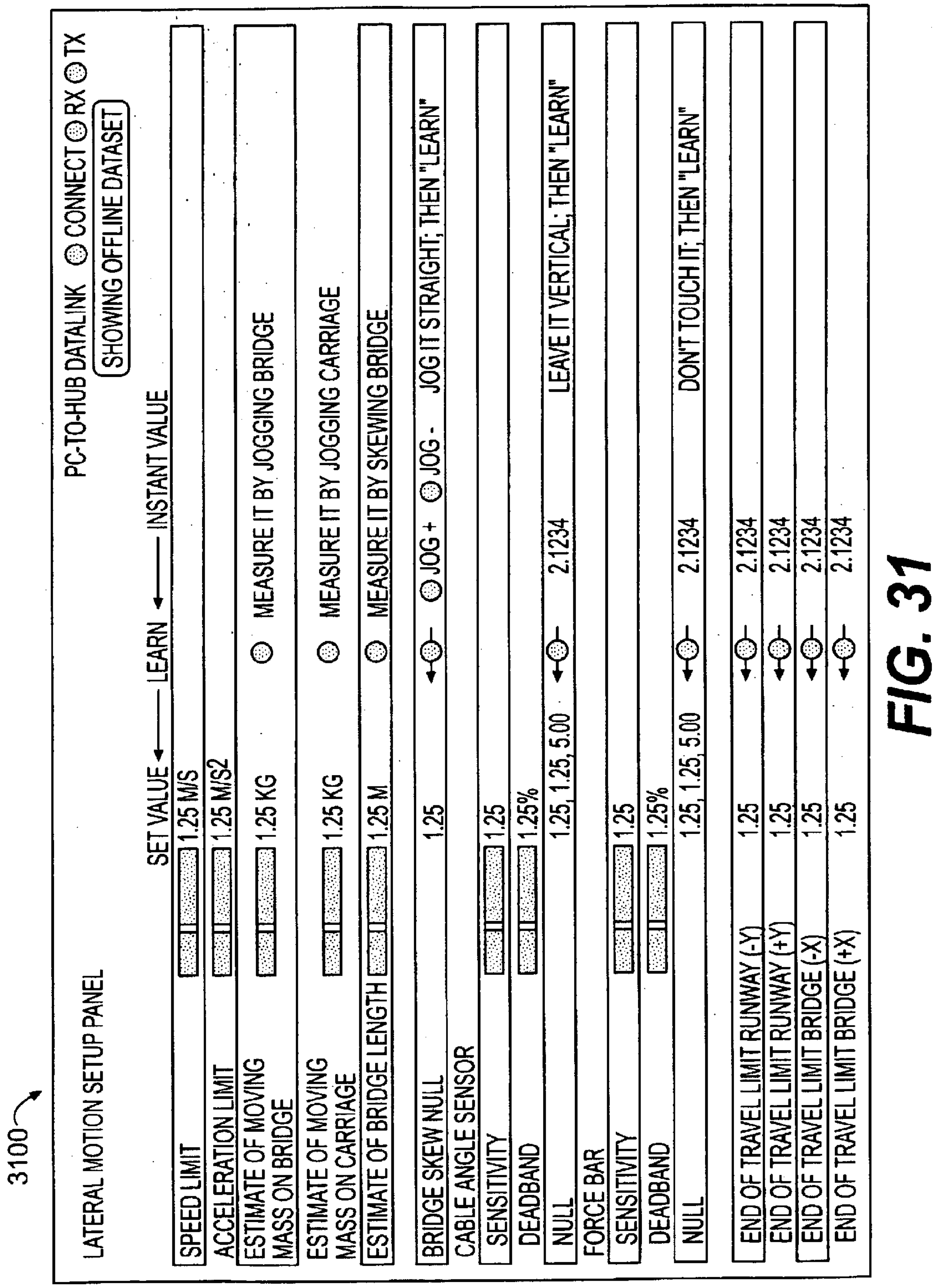
FIG. 31 is a screen-shot illustrating the lateral motion setup panel of the GUI of FIG. 26.

FIG. 31 shows an exemplary lateral motion setup panel, similar to the panel shown in FIG. 30 except for lateral motion module parameters. In FIG. 31, it should be noted that some parameters may be grayed out or (in a preferred embodiment) may disappear if the module they relate to is not part of the IAD configuration, as known by the software from the layout panel of FIG. 26. The operation of the lateral motion panel is analogous to the vertical motion panel described above with respect to FIG. 30.

Figure 32:
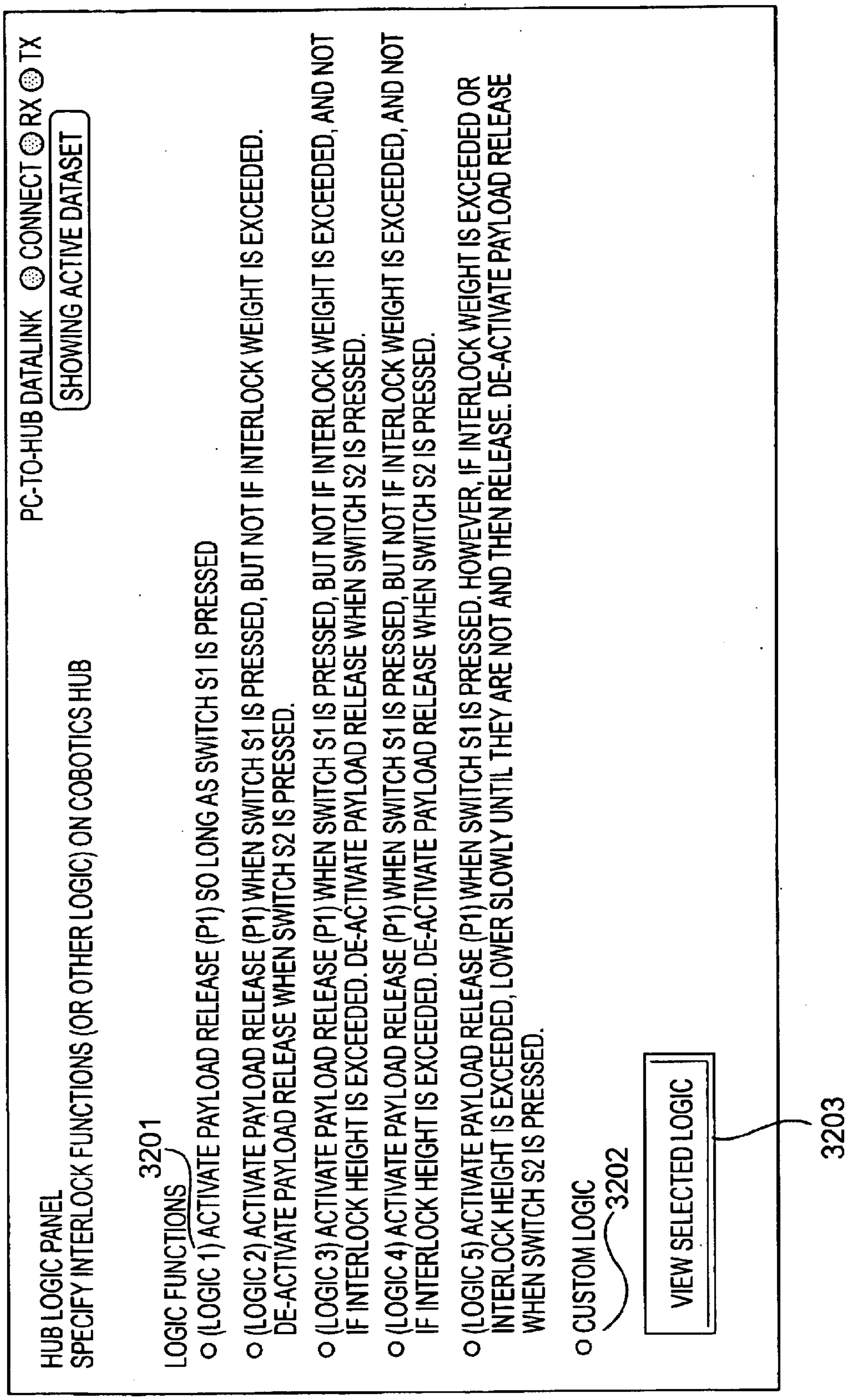
FIG. 32 is a screen-shot illustrating the hub logic setup panel of the GUI of FIG. 26.
Figure 33:
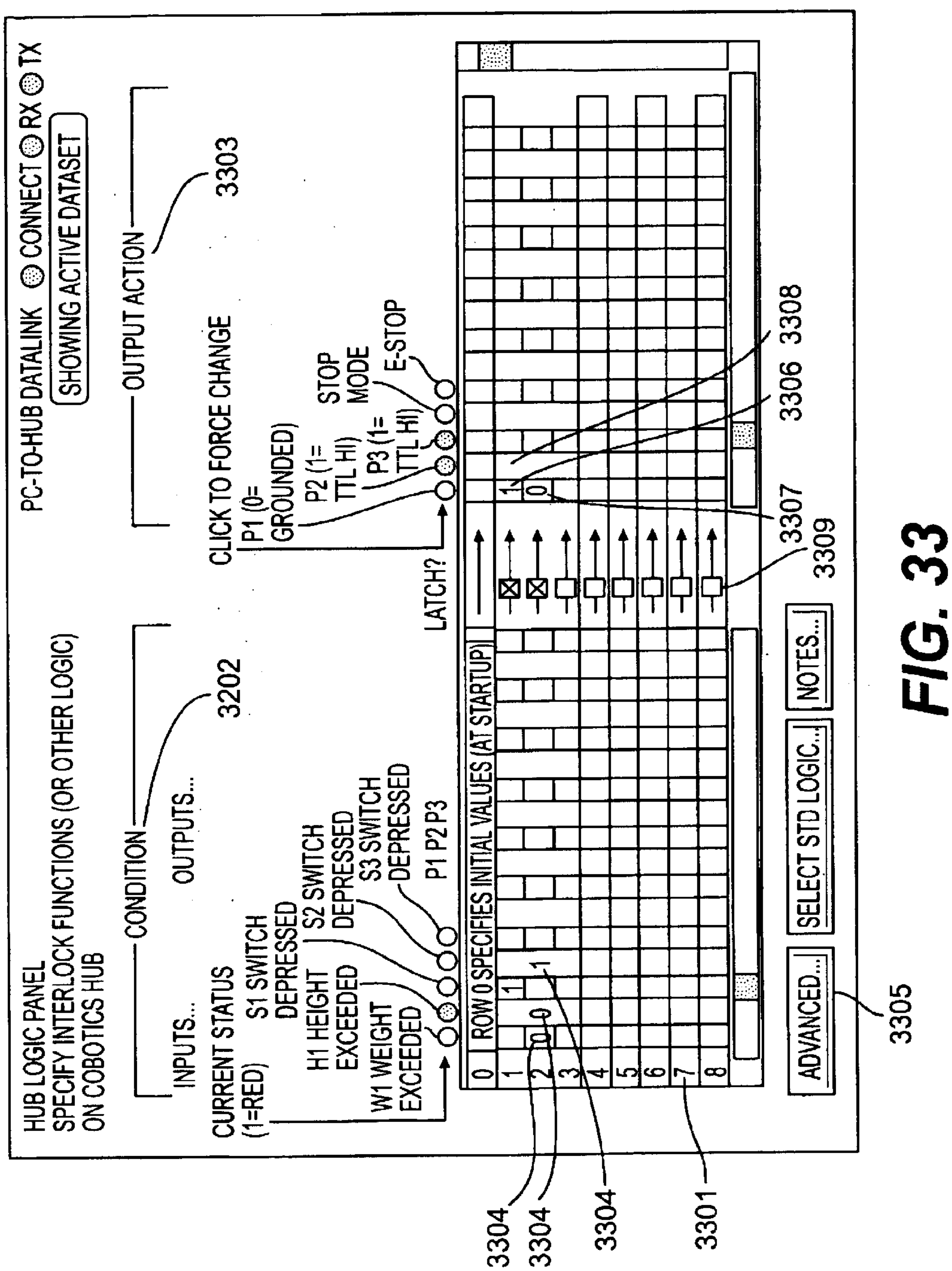
FIG. 33 is a screen-shot illustrating the custom logic setup panel of the GUI of FIG. 26.

FIG. 32 shows an exemplary hub logic panel. Preferably, this panel relates to programming of the logic functions of the IAD, such as conditions under which the IAD may move beyond a particular height. It also relates to programming of the digital and analog inputs and outputs which are available to the system integrator or installer via connector in hub 105. The system integrator or installer may take advantage of programmable logic to reduce the need for discrete logic components, or even, as is common practice, for pneumatic logic components. Further, not only may the integrator's sensors and actuators be logically programmed with respect to each other, but also they may control or be controlled by states of the IAD. Of course, additional hub functions can be implemented according to the particular application and the hub panel can be modified to accommodate and reflect these variations.

Standard Logic Functions 3201 are presented and may be selected by clicking a button. Standard logic functions that apply to the most general and common uses can be presented for convenience and ease. Of course, a variety of standard logic functions may be offered, of which the ones suggested in the figure are only examples.

For programmers of greater sophistication who desire greater flexibility, access is given via custom logic option 3202 to use a more general logic program, which may be viewed and programmed by clicking view selected logic button 3203. The button opens the custom logic panel of which an exemplary embodiment is shown in detail in FIG. 33. The custom logic panel offers a multiplicity of programmable rules 3301. Each rule has a condition 3302 and an action 3303, the action being taken if the condition is met.

A condition may be specified in terms of required logical values, in a preferred embodiment shown as zeros, ones, and blanks 3304, or by other symbols. Among the logical states which can be used to construct a condition are the states of switches readable by the IAD, the states of the inputs or outputs of the hub 105, the logical states of internal virtual states which are not electrically accessible, and inequality comparisons between analog values measured or internal to the IAD, in comparison to analog values specified in a subpanel accessed via advanced button 3305. A condition is satisfied if the state of all those logical values for which a one is placed is high, and all those for which a zero is placed is low, and without regard to the value of those for which a blank is placed Actions may be specified in terms of logical values as above, for the various outputs. Outputs include ones that change the state of the IAD, for instance putting it into "stop" state, or change the values of the electrically accessible outputs of the hub, or change the value of internal virtual states which are not electrically accessible. An output is set high where a One is placed, e.g. 3306, low where a Zero is placed, e.g. 3307, and left unchanged where a Blank is placed. e.g. 3308. Latch box 3309, if checked, indicates that the outputs specified by Action should retain their new value after the condition is no longer satisfied, or if unchecked indicates that the output should return to its former value.

Figure 34:
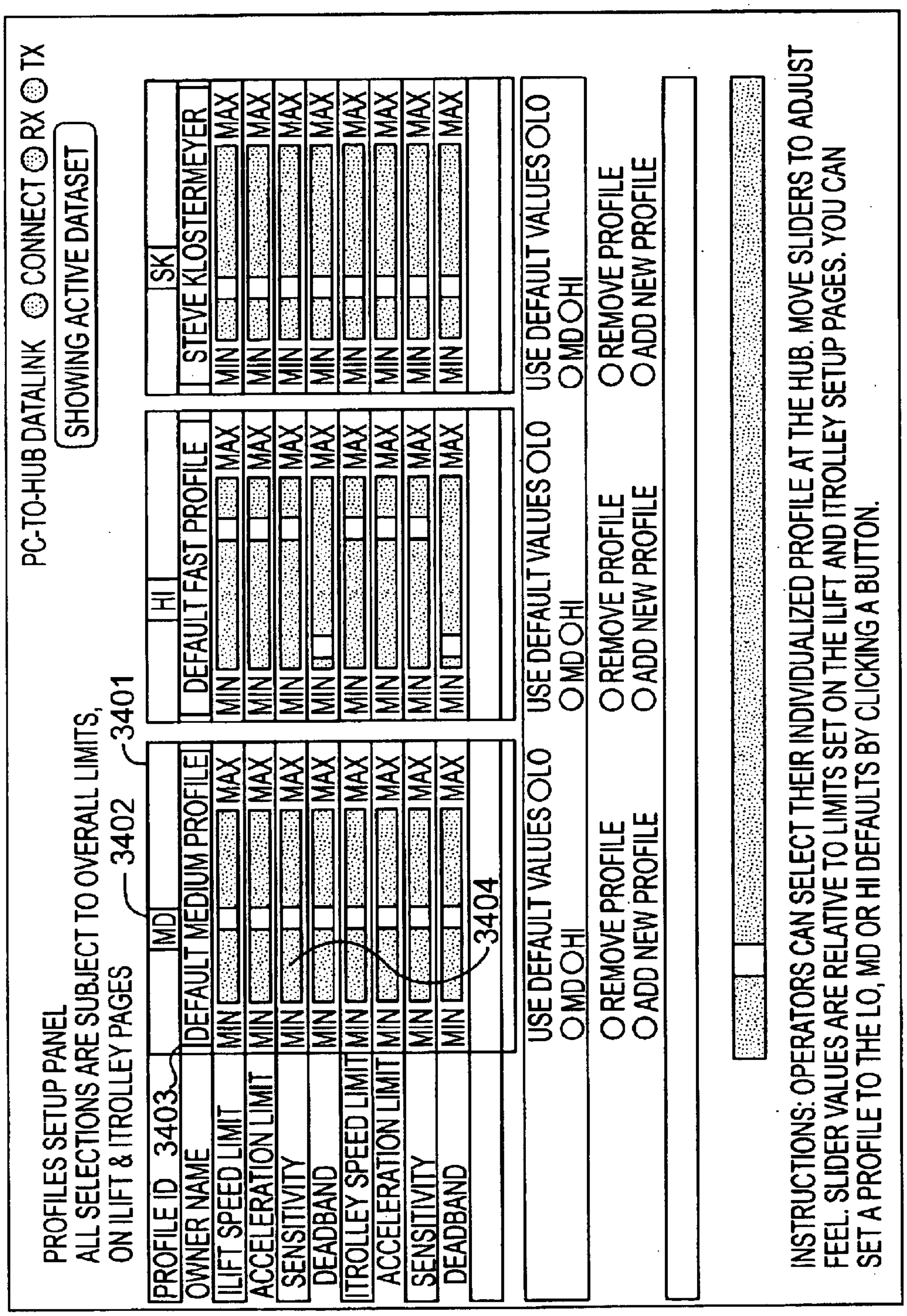
FIG. 34 is a screen-shot illustrating the profiles setup panel of the GUI of FIG. 26.

FIG. 34 shows an exemplary Profile Setup panel. It can be utilized to individualize certain parameters of the IAD in order to make its operation most comfortable to each operator. A multiplicity of profiles 3401 are accessible. Profile ID 3402 gives the abbreviated identifier that will appear on Display Panel of Hub 105. Owner Name 3403 is a text field for reference. Sliders such as slider 3404 allow adjustment of several parameters within a reasonable range. Shown is an exemplary embodiment, however other graphic interface elements may be implemented by those skilled in the art and used.

Figure 35:
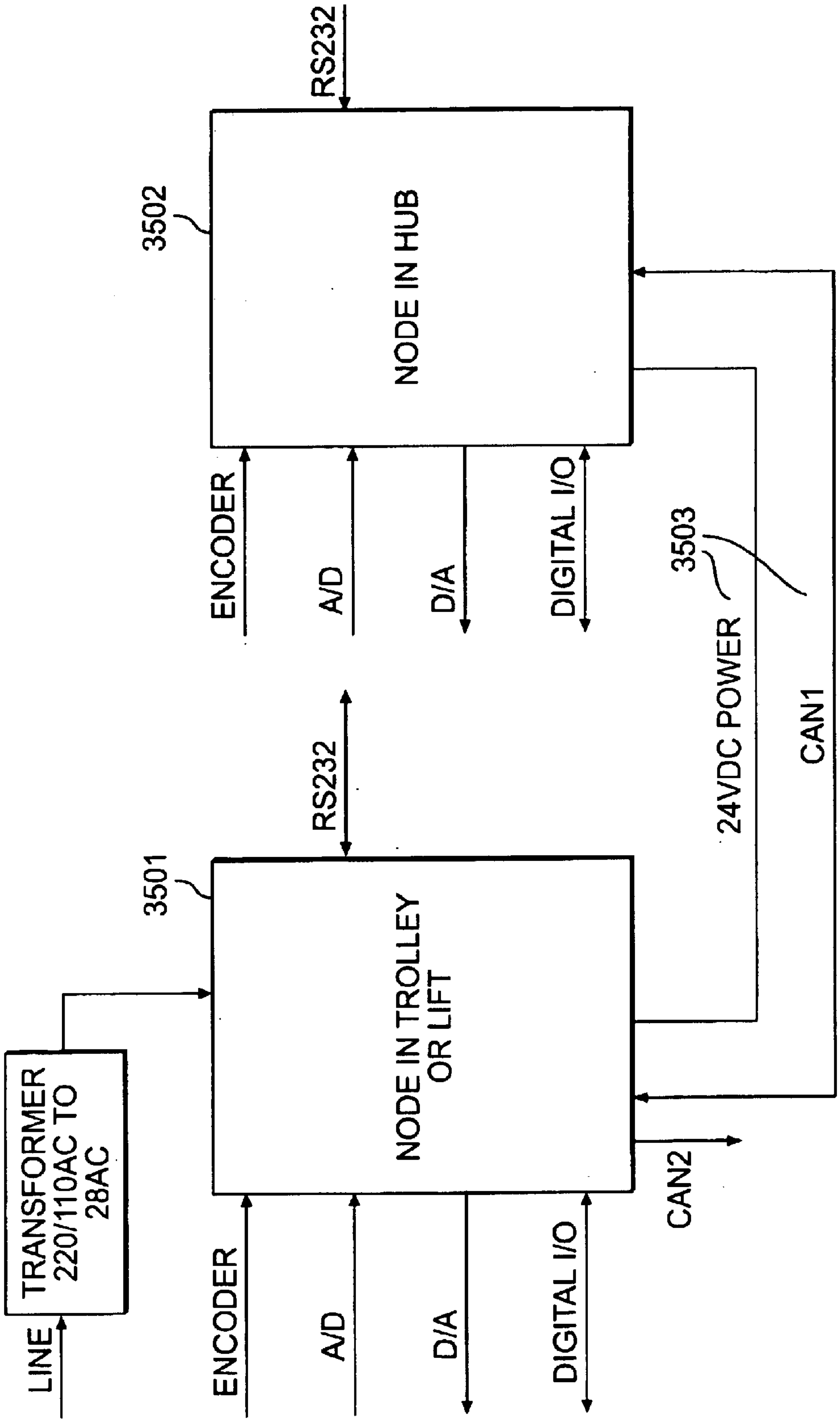
FIG. 35 is a block diagram illustrating exemplary inputs, outputs, and communication between the computational nodes of FIG. 1.

FIG. 35 shows a block diagram illustrating exemplary inputs, outputs, and communication between a computational node in a lift 103 or trolley 101, and one in the hub 105. Computational node 3501 in a module (which may be trolley 101 or lift 103 or another) has a variety of inputs and outputs as shown. Computational node 3502 in a hub has a variety of inputs and outputs as shown. As shown in FIG. 35, the computational node can include a plurality of different communication interfaces such as A/D and D/A inputs and outputs, RS 232, digital interfaces, etcetera. Nodes 3501 and 3502 communicate by a cable 3503 with a low wirecount, carrying power and, in an exemplary embodiment, CAN communication. In other embodiments, wireless communications using appropriate protocols such as an infrared, wireless LAN or Bluetooth protocol may be implemented.

Figure 36:
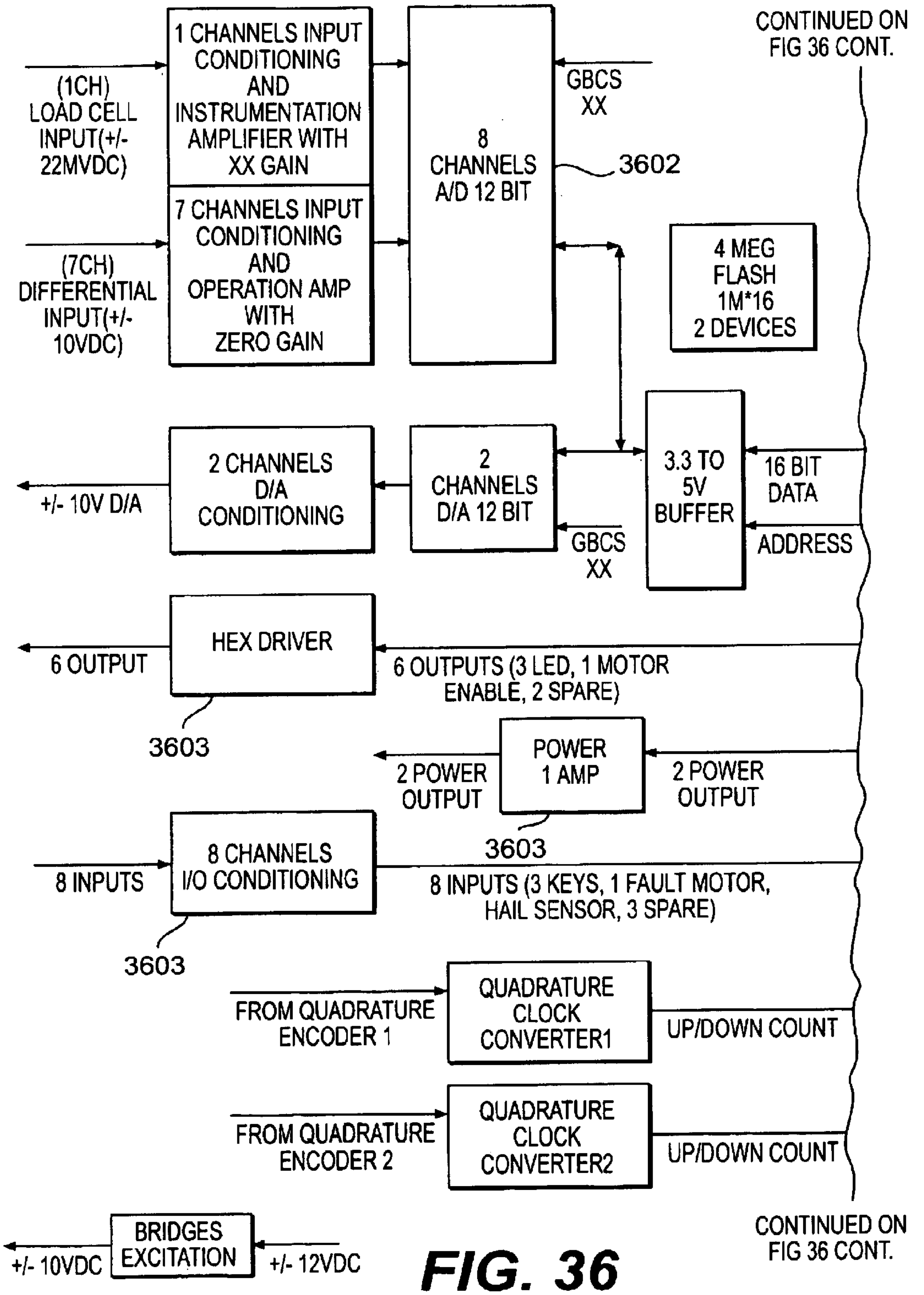
FIG. 36 is a block diagram illustrating the electronics of an exemplary computational node of FIG. 1.
Figure 36:
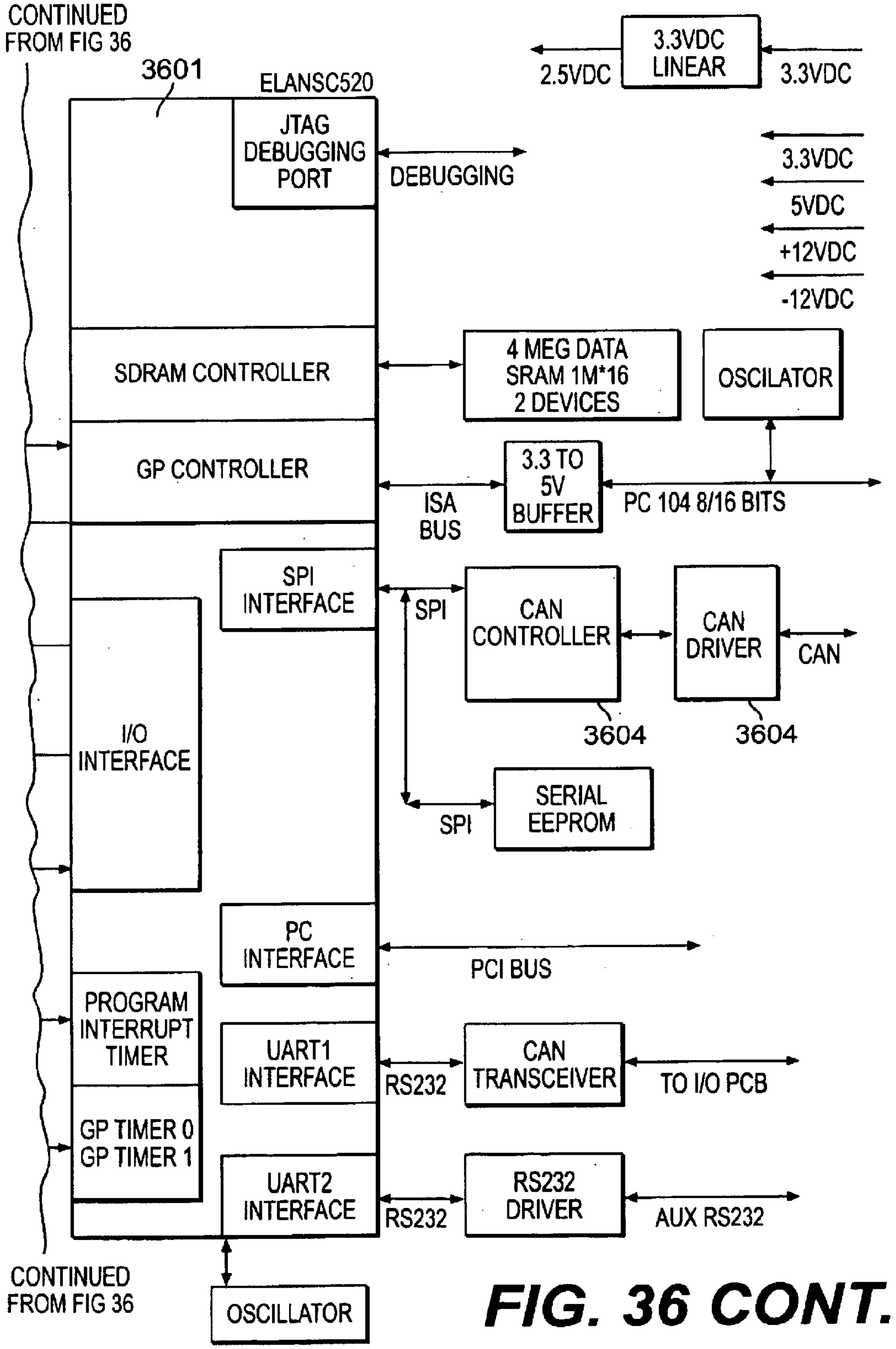

FIG. 36 shows a block diagram illustrating exemplary electronics that comprise a computational node on a trolley 101 or lift 103. A variety of general purpose as well as digital signaling processing platforms can be utilized according to the described embodiments. Processing unit 3601, in a preferred embodiment, includes an Applied Micro Devices ElanSC520 CPU. An Analog-Digital converter 3602 reads in analog voltages. Digital input and output is accomplished by 10 channels 3603. CAN communication is accomplished by drivers 3604. Of course, the electronic assembly can include a wide variety of support components, some of which are shown in FIG. 36 and some of which have been omitted for ease and clarity of description and understanding. The described embodiment includes various PCI and ISA buses, RS-232 communications, a JTAG debugging port, FLASH memory as well as SRAM and SDRAM just to name a few.

Figure 37:
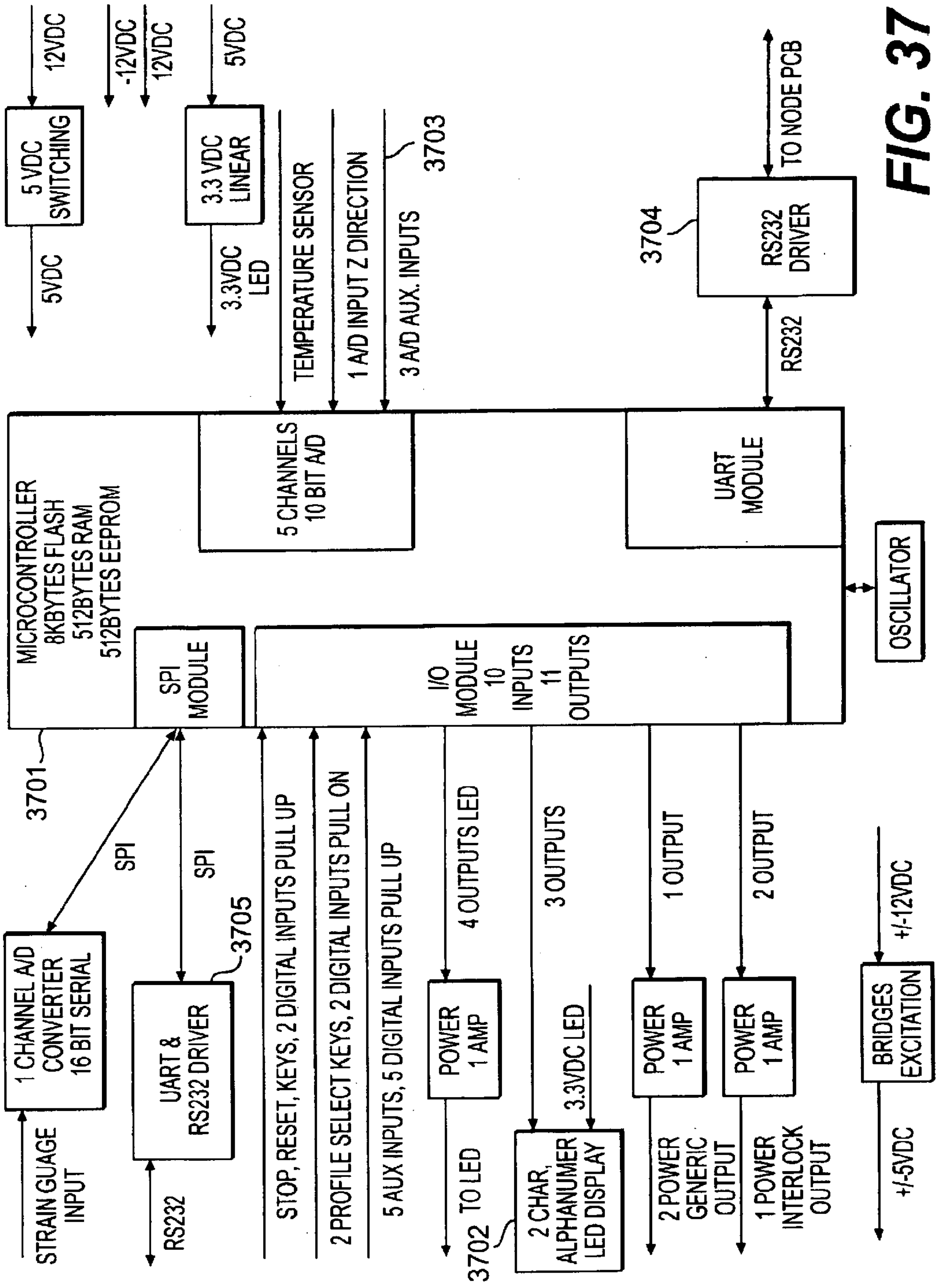
FIG. 37 is a block diagram illustrating the electronics of an exemplary computational node on a Hub.

FIG. 37 shows a block diagram illustrating exemplary electronics that include a computational node on a hub 105 previously described herein above. In an exemplary embodiment, the processor 3701 is a Atmel model AT90S85535-8JC Microcontroller although may variations are possible. Display 1303 is controlled by display driver 3702. Analog inputs are received by A/D converter 3703 which in a preferred embodiment is a part of processor 3701. Communication with another computational node is done by driver 3704, which in the exemplary embodiment is a CAN driver. Serial interface 3705 supports communication with a user-supplied computer or PDA 110 via connector 1608 on hub 105. Of course, may different variations and features are possible.

FIG. 38 shows a diagram illustrating an exemplary structure of a communication packet utilized by computational nodes for communication. Preferably, communications is done using a packet based command/response setup running on the CAN physical interface in half-duplex communications channel. According to the exemplary embodiment, the packet includes a number of fields carrying information in a digital format. FIG. 38 shows a SIZE field, a DEVICE_ID, a CMD_TYPE, DATA, and CHKSUM and the respective sizes and functions of each field. Of course, the packet shown in FIG. 38 is merely exemplary and many variations are possible.

The preferred communications medium is a pair of wires labeled CANH and CANL. 120-ohm termination resistors must be installed at both ends of the bus to function properly. For this exemplary embodiment, the baud rate is 115200, although other baud rates are acceptable. The character format utilizes RS-232 protocol with eight data bits, one stop bit and no parity.

It should be understood that the programs, processes, methods and systems described herein are not related or limited to any particular type of material handling hardware, intelligent assist devices, or network system (hardware or software), unless indicated otherwise. Various types of general purpose or specialized systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. While various elements of the preferred embodiments have been described as being implemented in software, in other embodiments in hardware or firmware implementations may alternatively be used, and vice-versa.

It will be apparent to those of ordinary skill in the art that methods involved in the system and method may be partially embodied in a computer program product that includes a computer usable medium. For example, such as, a computer usable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

We claim:

1. An intelligent trolley module for use in an intelligent assist system, the intelligent trolley module comprising:

a plurality of wheels on the intelligent trolley module and configured to move the trolley module along an overhead track;

an actuator on the intelligent trolley module for driving at least one of the wheels in a horizontal direction;

a computational node on the intelligent trolley module for controlling the actuator; and a communication interface on the intelligent trolley module for interfacing with an information network and for providing input/output digital communication between the computational node on the intelligent trolley module, and at least one a computational node on at least one other module within the intelligent assist system via a common data link.

2. The intelligent trolley of claim 1 wherein the actuator comprises a gearing.

3. The intelligent trolley of claim 1 wherein the actuator comprises a motor.

4. The intelligent trolley of claim 1 wherein the computational node implements a virtual limit controlling motion of the trolley.

5. The intelligent trolley of claim 1 further comprising a roller.

6. The intelligent trolley of claim 1 further comprising a manually operable roller release.

7. The intelligent trolley of claim 1 further comprising an automatic roller release.

8. The intelligent trolley of claim 1 further comprising a position indicator for indexing motion of the device.

9. The intelligent trolley of claim 8 wherein the position indicator comprises a hall switch.

10. The intelligent trolley of claim 1 wherein the computational node uses odometry for monitoring the motion of the trolley.

11. An intelligent lift module for use in an intelligent assist system, the intelligent lift module comprising:

an actuator on the intelligent lift module;

a support connected to the actuator and configured to move a payload in a substantially vertical direction;

a computational node on the intelligent lift module in communication with the actuator for controlling movement of the payload; and a communication interface on the intelligent lift module for interfacing with an information network and for providing input/output digital communication between the computational node on the intelligent lift module, and at least one computational node on at least one other module within the intelligent assist system via a common data link.

12. The intelligent lift module of claim 11 wherein the support comprises a cable.

13. The intelligent lift module of claim 11 wherein the cable is raised and lowered by a reel.

14. The intelligent lift module of claim 13 wherein the reel comprises a translating reel.

15. The intelligent lift module of claim 14 wherein the reel comprises a slidable translating reel.

16. The intelligent lift module of claim 14 wherein the reel further comprises a cam follower.

17. The intelligent lift module of claim 11 further comprising a replaceable guide unit containing a cam follower.

18. The intelligent lift module of claim 11 further comprising a position indicator.

19. The intelligent lift module of claim 17 further comprising a hall switch.

20. The intelligent lift module of claim 17 further comprising a motor encoder.

21. The intelligent lift module of claim 17 wherein the reel comprises a plurality of hall switches configured to index multiple rotations of the reel.

22. The intelligent lift module of claim 11 further comprising a virtual limit to the lift.

23. An input device for use in an intelligent assist system, the input device comprising:

a handle for gripping; and at least one proportional control;

wherein the input device is in communication with a computational node disposed on a multi-function hub, wherein the proportional control when moved provides a proportional output signal to the computational node, and wherein the computational node on the multi-function hub passes the output signal to at least one computational node on at least one other module within the intelligent assist system via a common data link, and wherein the multi-function hub interfaces with an information network.

24. The input device of claim 23 wherein the input device comprises a pendant.

25. The input device of claim 23, wherein the output signal comprises one of an up signal to lift a payload up and a down signal to lower the payload down.

26. The input device of claim 23, wherein the proportional control comprises a shaft to rotate a magnet in the vicinity of a hall effect sensor to create the output signal.

27. The input device of claim 23, further comprising a plurality of buttons configured to be assigned specific functions.

28. The input device of claim 27 wherein the specific functions comprise stop and reset.

29. The intelligent trolley of claim 1, wherein the common data link is a bus.

30. The intelligent trolley of claim 1, wherein the common data link is a wireless data link.

31. The intelligent lift module of claim 11, wherein the common data link is a bus.

32. The intelligent lift module of claim 11, wherein the common data link is a wireless data link.

33. The input device of claim 23, wherein the common data link is a bus.

34. The input device of claim 23, wherein the common data link is a wireless data link.

35. The intelligent trolley of claim 1, wherein the at least one other module comprises a lift.

36. The intelligent trolley of claim 1, wherein the at least one other module comprises a multi-function hub.

37. The intelligent lift module of claim 11, wherein the at least one other module comprises a trolley.

38. The intelligent lift module of claim 11, wherein the at least one other module composes a multi-function hub.

39. The input device of claim 23, wherein the at least one other module comprises a trolley.

40. The input device of claim 23, wherein the at least one other module comprises a lift.

* * * * *